(12) United States Patent
Ishido

(10) Patent No.: US 11,277,537 B2
(45) Date of Patent: Mar. 15, 2022

(54) IMAGE FORMING APPARATUS CAPABLE OF READING SHEET BEING CONVEYED

(71) Applicant: KYOCERA Document Solutions Inc., Osaka (JP)

(72) Inventor: Kohei Ishido, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/221,930

(22) Filed: Apr. 5, 2021

(65) Prior Publication Data

US 2021/0321013 A1 Oct. 14, 2021

(30) Foreign Application Priority Data

Apr. 9, 2020 (JP) .............................. JP2020-070599

(51) Int. Cl.
*H04N 1/00* (2006.01)
*H04N 1/028* (2006.01)
*H04N 1/12* (2006.01)
*G06F 3/12* (2006.01)

(52) U.S. Cl.
CPC ..... *H04N 1/00824* (2013.01); *H04N 1/00018* (2013.01); *H04N 1/00034* (2013.01); *H04N 1/00037* (2013.01); *H04N 1/00076* (2013.01); *H04N 1/00408* (2013.01); *H04N 1/00477* (2013.01); *H04N 1/02805* (2013.01); *H04N 1/02815* (2013.01); *H04N 1/1215* (2013.01)

(58) Field of Classification Search
CPC ........... H04N 1/00824; H04N 1/00018; H04N 1/00034; H04N 1/00037; H04N 1/00076; H04N 1/00408; H04N 1/00477; H04N 1/02805; H04N 1/02815; H04N 1/1215; H04N 1/00909; H04N 1/4097
USPC .................. 358/1.11–1.18, 504, 406, 442
See application file for complete search history.

(56) References Cited

U.S. PATENT DOCUMENTS

| | | | | |
|---|---|---|---|---|
| 2007/0291324 A1* | 12/2007 | Kamei | ............... | H04N 1/00909 358/474 |
| 2015/0350460 A1* | 12/2015 | Hirata | ............... | H04N 1/00909 358/498 |
| 2017/0318164 A1* | 11/2017 | Ohmi | ............... | G06K 9/00442 |
| 2021/0173334 A1* | 6/2021 | Ishido | ............... | H04N 1/32609 |

FOREIGN PATENT DOCUMENTS

JP H08-168002 A 6/1996

* cited by examiner

*Primary Examiner* — Chad Dickerson
(74) *Attorney, Agent, or Firm* — IP Business Solutions, LLC

(57) ABSTRACT

An image forming apparatus includes a line sensor capable of reading a sheet being conveyed. A signal processing circuit generates, based on respective analog picture signals of pixels and in order of sequence of the pixels, detection signals each indicating whether or not a reflecting object has been read. A first counting circuit measures a duration time which is a time during which the detection signals maintain a level indicating that the reflecting object has been read. When the duration time reaches or exceeds a first specified time, the first counting circuit changes a level of a first detection result signal to a level indicating necessity of cleaning. A unit control circuit determines, based on the level of the first detection result signal, whether or not cleaning is necessary.

10 Claims, 12 Drawing Sheets

IMAGE FORMING APPARATUS CAPABLE OF READING SHEET BEING CONVEYED

INCORPORATION BY REFERENCE

This application claims priority to Japanese Patent Application No. 2020-070599 filed on Apr. 9, 2020, the entire contents of which are incorporated by reference herein.

BACKGROUND

The present disclosure relates to image forming apparatuses capable of conveying a sheet to be printed and reading the sheet being conveyed.

An image forming apparatus may be provided with an image sensor for use in reading an original document. For example, a multifunction peripheral or a copying machine is provided with an image sensor. It includes a transparent plate provided opposite to the image sensor. The image sensor is provided on one side of the transparent plate and an original document is placed on the other side of the transparent plate. The image sensor receives light reflected from the original document. If the image sensor reads an original document through the transparent plate with dirt, the amount of light received by light-receiving elements of the image sensor corresponding in position to the dirt may decrease. As a result, a dark streak may appear in image data acquired by the reading. The following is an example of an apparatus capable of detecting dirt on a CIS image sensor.

For example, there is proposed a facsimile apparatus that includes: a CIS image sensor capable of converting gray-scale information on an original document to electrical information; an A/D converter capable of converting the electrical information from the CIS image sensor to a digital signal; a white reference memory that stores white reference data for use in compensating the darkness of the original document; a white compensator capable of compensating, based on the white reference data, the digital signal output by the A/D converter; and an image memory controller capable of performing transmission control of the white-compensated digital signal, wherein the white compensator is provided in conjunction with a determiner capable of detecting dirt on the CIS image sensor based on a digital signal of white data during reading of the original document with reference to the white reference data in the white reference memory and outputting an ARM signal, thus detecting the dirt on the surface of the CIS image sensor prior to facsimile transmission.

SUMMARY

A technique improved over the aforementioned technique is proposed as one aspect of the present disclosure. An image forming apparatus according to an aspect of the present disclosure includes a sheet conveying device, an image forming device, a sheet reading unit, a signal processing circuit, a unit control circuit, and a first counting circuit. The sheet conveying device is capable of conveying a sheet. The image forming device forms an image on the sheet being conveyed. The sheet reading unit includes a lamp and a line sensor capable of reading the sheet being conveyed and is provided upstream of the image forming device in a direction of sheet conveyance. The signal processing circuit generates, based on respective analog picture signals of pixels output by the line sensor and in order of sequence of the pixels, detection signals each indicating whether or not a reflecting object on the sheet reading unit has been read. The first counting circuit outputs a first detection result signal. Furthermore, the first counting circuit measures a duration time which is a time during which the detection signals maintain a level indicating that the reflecting object on the sheet reading unit has been read. When the duration time reaches or exceeds a predetermined first specified time, the first counting circuit changes a level of the first detection result signal from a level indicating unnecessity of cleaning to a level indicating necessity of cleaning. When the duration time is shorter than the first specified time, the first counting circuit sets the level of the first detection result signal at the level indicating unnecessity of cleaning. The unit control circuit determines, based on the level of the first detection result signal, whether or not it is necessary to clean the sheet reading unit.

DETAILED DESCRIPTION

Hereinafter, a description will be given of an image forming apparatus according to an embodiment as an aspect of the present disclosure with reference to FIGS. 1 to 12. The following description takes a multifunction peripheral 100 as an example of the image forming apparatus. The multifunction peripheral 100 is capable of performing printing and transmission based on image data. The contents, including structures, configurations, and arrangements, of the multifunction peripheral described in this embodiment are not intended to limit the scope of the image forming apparatus subject to the disclosure and are merely illustrative examples.

(Multifunction Peripheral 100)

Figure 1:
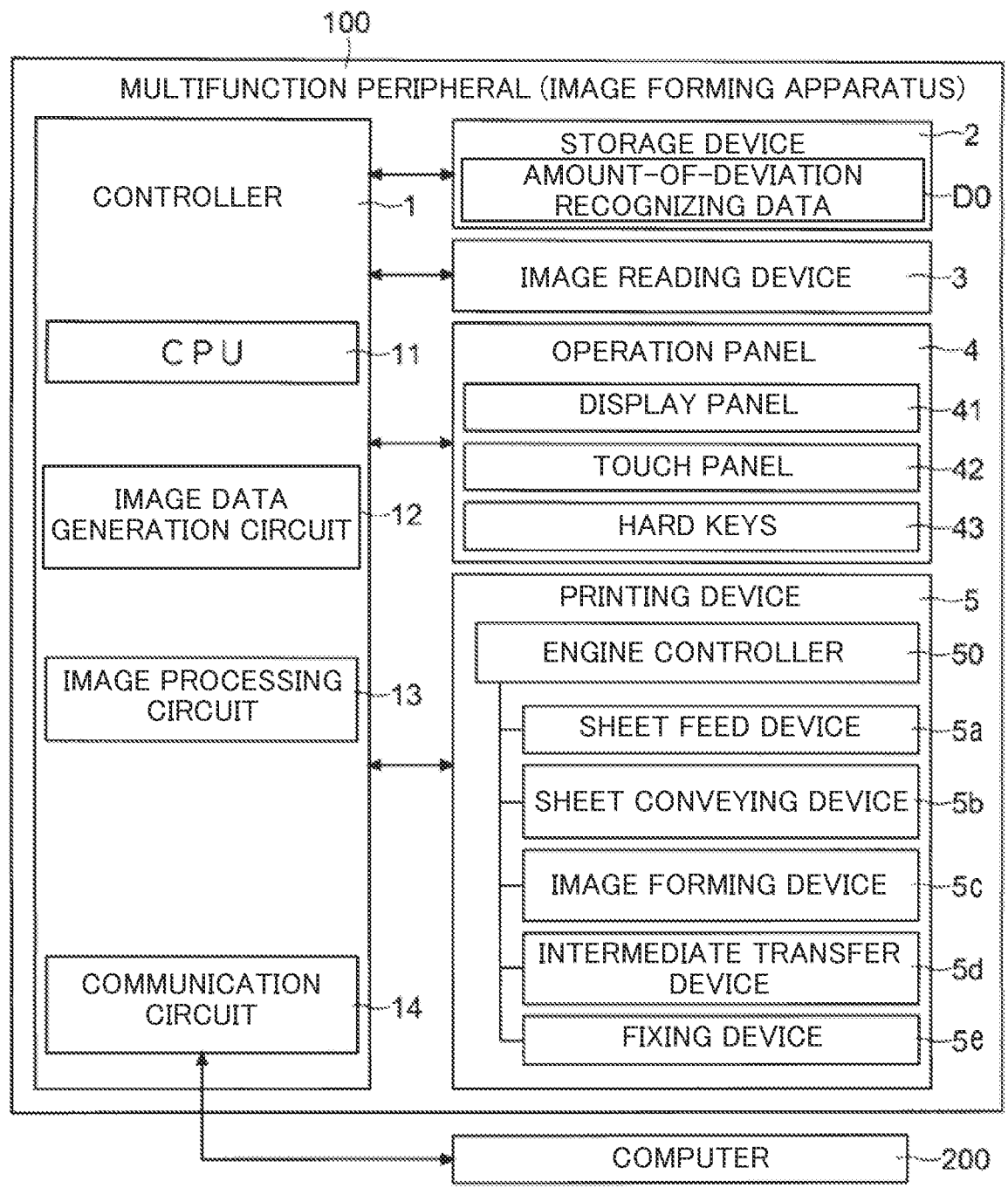
FIG. 1 is a block diagram showing an example of a multifunction peripheral according to an embodiment.
Figure 2:
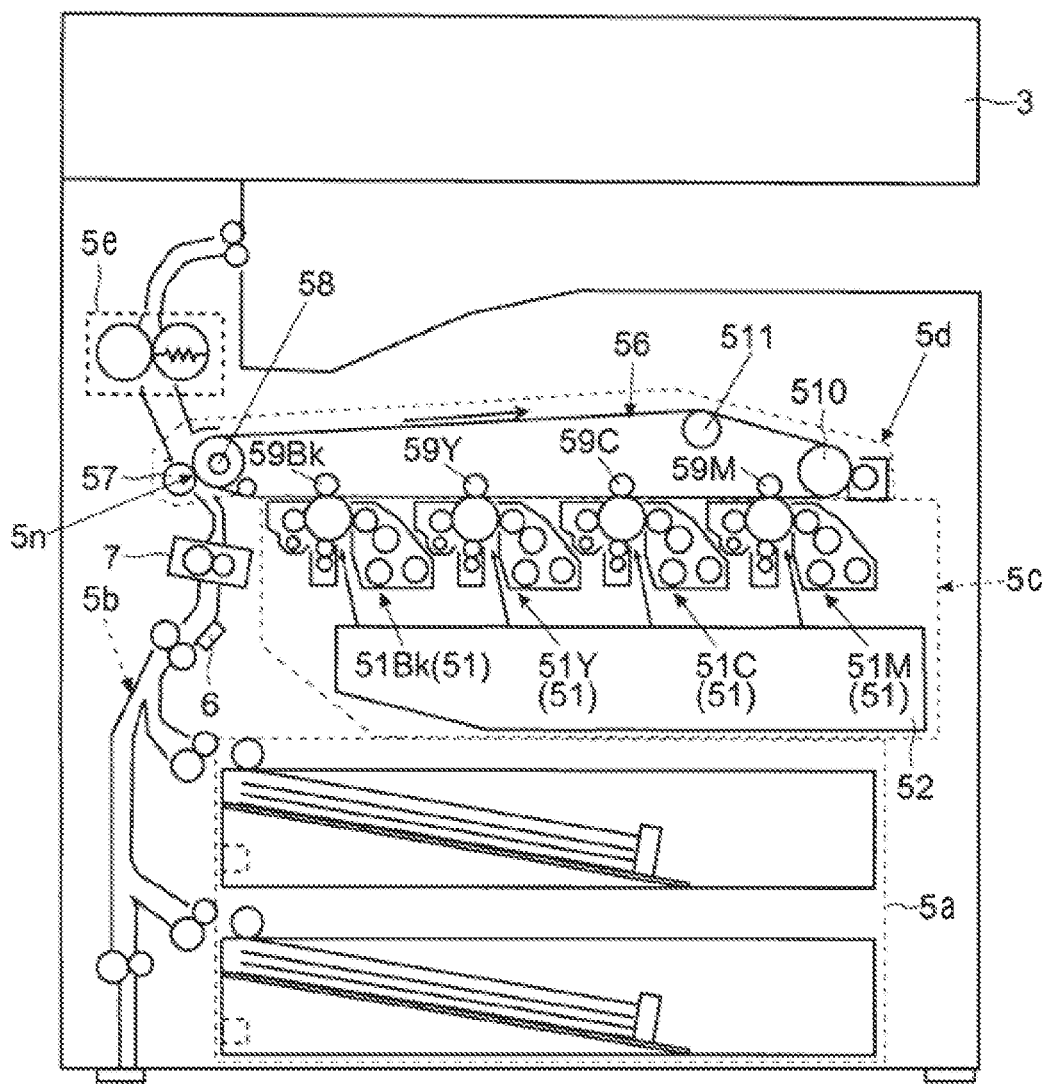
FIG. 2 is a view showing an example of the multifunction peripheral according to the embodiment.
Figure 3:
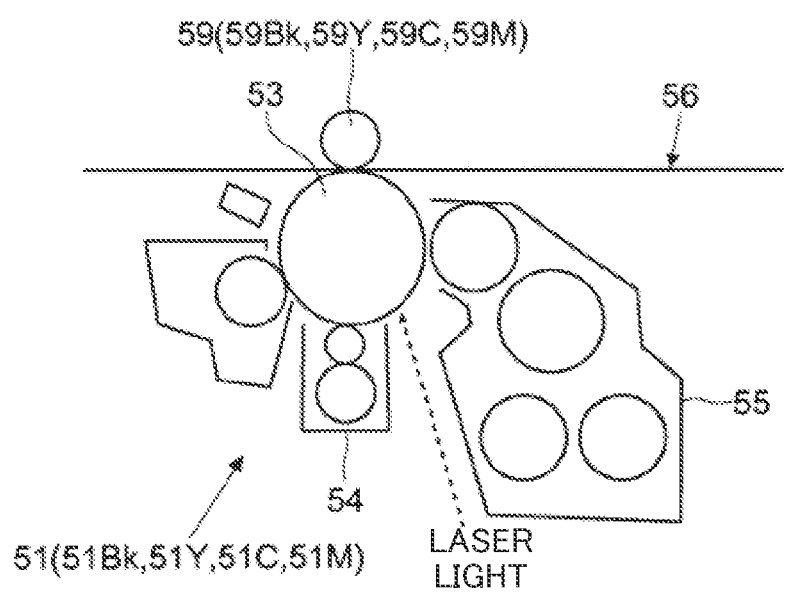
FIG. 3 is a view showing an example of an image forming device in the embodiment.

The multifunction peripheral 100 according to the embodiment will be described with reference to FIGS. 1 to 3. FIGS. 1 and 2 show an example of the multifunction peripheral 100 according to the embodiment. FIG. 3 is a view showing an example of an image forming device 5c in the embodiment.

As shown in FIG. 1, the multifunction peripheral 100 includes a controller 1, a storage device 2, an image reading device 3, an operation panel 4, and a printing device 5.

The controller 1 controls the operation of the multifunction peripheral 100. The controller 1 controls the respective operations of the components of the multifunction peripheral 100 during execution of jobs (including copy and sending). The controller 1 includes a CPU 11, an image data generation circuit 12, an image processing circuit 13, and a communication circuit 14. The CPU 11 performs processing and calculation for jobs. The image data generation circuit 12 includes an A/D converter circuit. The image data generation circuit 12 processes analog picture signals created by reading of an original document by the image reading device 3 and output from the image reading device 3, thus generating document image data. The image processing circuit 13 is an integrated circuit (for example, an ASIC) for image processing. The image processing circuit 13 performs image processing of the document image data.

The communication circuit 14 includes a communication control circuit and a communication memory. The communication memory stores communication software. The communication control circuit controls communications based on the communication software. The communication circuit 14 communicates with a computer 200. For example, the computer 200 is a PC or a server. The communication circuit 14 receives print data from the computer 200. The controller 1 allows the printing device 5 to make a print based on the received print data (a print job). The operation panel 4 accepts the setting of a destination. The controller 1 allows the communication circuit 14 to send to the set destination image data based on the reading of the original document (scanning and sending).

The storage device 2 includes a RAM, a ROM, and a storage. For example, the storage is an HDD or an SSD. The controller 1 controls the components based on programs and data stored in the storage device 2. The image reading device 3 includes a light source and an image sensor. The image reading device 3 reads an original document.

The operation panel 4 accepts settings from a user. The operation panel 4 includes a display panel 41, a touch panel 42, and hard keys 43. The controller 1 allows the display panel 41 to display messages, screens for settings, and screen images for operation. For example, screen images for operation are buttons, keys, and tabs. The controller 1 recognizes, based on the output of the touch panel 42, a screen image for operation on which an action has been performed. The hard keys 43 include a Start key and a numeric keypad. The touch panel 42 and the hard keys 43 accept a setting operation (a job-related operation) of the user. For example, they accept the settings for the type of job to be executed and setting values of the job. The controller 1 recognizes the contents of the settings based on the outputs of the operation panel 4.

The multifunction peripheral 100 includes the printing device 5. The printing device 5 includes an engine controller 50, a sheet feed device 5a, a sheet conveying device 5b, an image forming device 5c, an intermediate transfer device 5d, and a fixing device 5e. The engine controller 50 includes an engine control circuit 50a (an engine CPU) and an engine memory 50b (see FIG. 7). The engine memory 50b stores a program and data for print control. Based on a print instruction from the controller 1, the engine controller 50 controls the operations of the sheet feed device 5a, the sheet conveying device 5b, the image forming device 5c, the intermediate transfer device 5d, and the fixing device 5e. The engine control circuit 50a controls the above operations based on the program and data stored in the engine memory 50b.

The sheet feed device 5a includes, for example, sheet cassettes in which sheets are placed, and a sheet feed roller capable of feeding a sheet forward. In printing, the engine controller 50 allows the sheet feed device 5a to feed a sheet. The sheet conveying device 5b includes, for example, a motor, a pair of conveyance rollers, and a sheet conveyance path. The engine controller 50 allows the sheet conveying device 5b to convey a sheet fed from the sheet feed device 5a. The sheet conveying device 5b conveys the sheet within the multifunction peripheral 100 (allows the sheet to pass in the sheet conveyance path).

The image forming device 5c forms an image (a toner image). As shown in FIGS. 2 and 3, the image forming device 5c includes four image forming units 51 for four colors and an exposure device 52. The multifunction peripheral 100 includes an image forming unit 51Bk capable of forming a black image, an image forming unit 51Y capable of forming an yellow image, an image forming unit 51C capable of forming an cyan image, and an image forming unit 51M capable of forming a magenta image. The image forming units 51Bk, 51Y, 51C, and 51M form different toner images having different colors. However, the image forming units 51Bk, 51Y, 51C, and 51M have the same basic structure. For this reason, in the following description, the sub-reference characters Bk, Y, C, and M of the image forming units 51 will be omitted unless otherwise stated.

Each image forming unit 51 includes a photosensitive drum 53, a charging device 54, and a developing device 55. In printing, the engine controller 50 rotates a drum motor (not shown), thus rotating the photosensitive drum 53. Furthermore, the engine controller 50 allows the charging device 54 to charge the photosensitive drum 53. Moreover, the engine controller 50 allows the exposure device 52 to expose the photosensitive drum 53 to light based on image data. The developing device 55 contains a developer containing a toner. The engine controller 50 allows the developing device 55 to develop an electrostatic latent image on the photosensitive drum 53 with the toner.

The intermediate transfer device 5d includes an intermediate transfer belt 56, a secondary transfer roller 57, a drive roller 58, primary transfer rollers 59Bk, 59Y, 59C, and 59M, and driven rollers 510 and 511. The axial directions of the rollers of the intermediate transfer device 5d are parallel with each other. The intermediate transfer belt 56 is endless. The intermediate transfer belt 56 is mounted around the rollers of the intermediate transfer device 5d. The intermediate transfer device 5d (the intermediate transfer belt 56) is subjected to primary transfer of toner images on the photosensitive drums 53. Furthermore, the intermediate transfer device 5d secondarily transfers a toner image to a sheet. The fixing device 5e includes, for example, a heater and a fixing roller. The engine controller 50 allows the fixing roller to apply heat and pressure to the sheet to which the toner image has been transferred. The engine controller 50 allows the fixing device 5e to fix the toner image. The sheet conveying device 5b discharges the sheet subjected to the fixing to the outside (a sheet output tray).

(Sheet Reading Unit 6 and Register-Less Unit 7)

Figure 4:
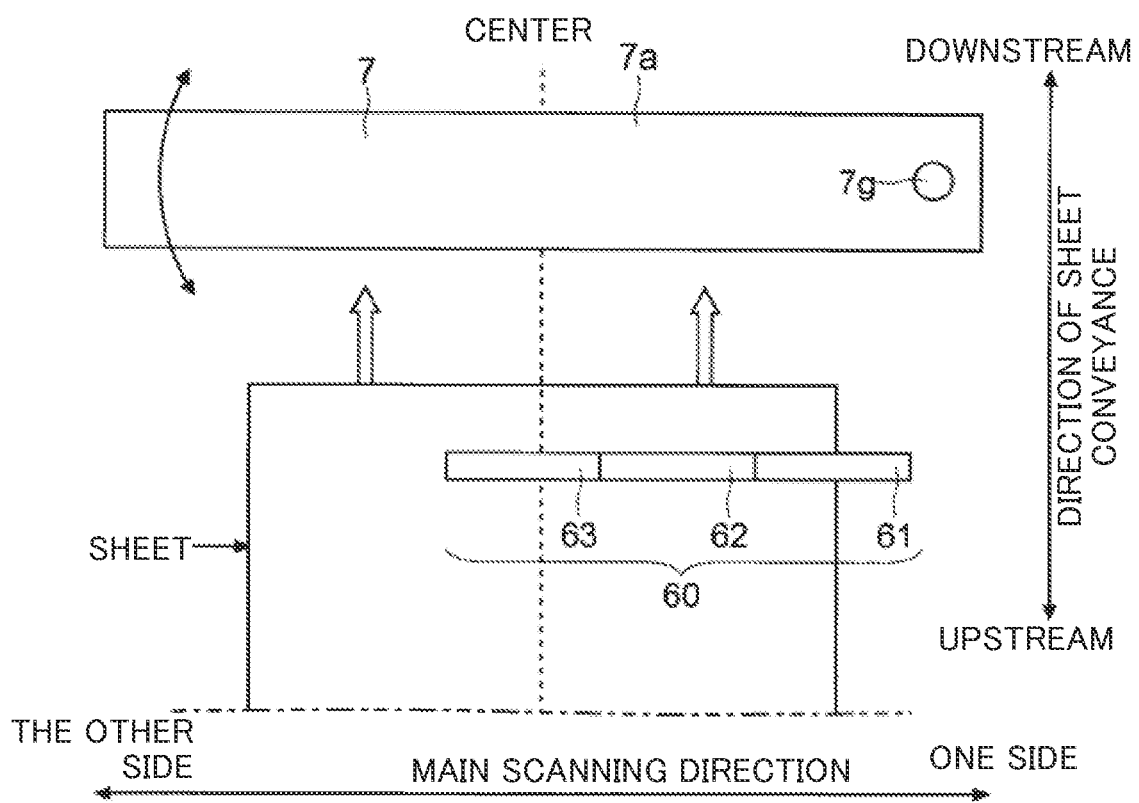
FIG. 4 is a view showing examples of units contained in the multifunction peripheral according to the embodiment.
Figure 5:
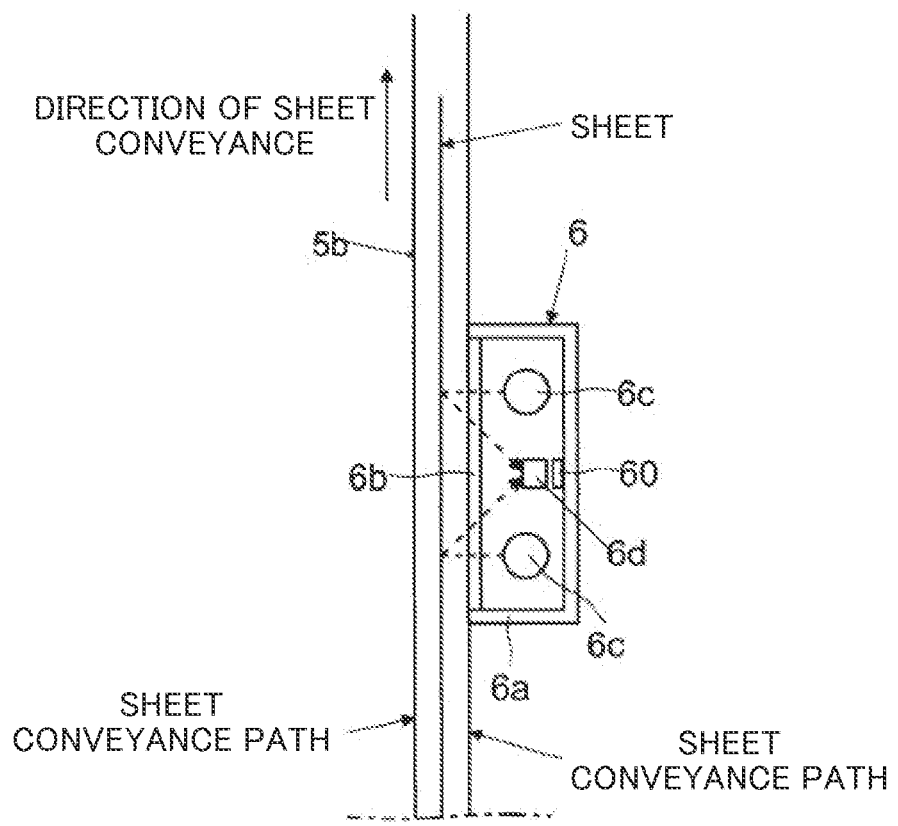
FIG. 5 is a view showing an example of a sheet reading unit in the embodiment.
Figure 6:
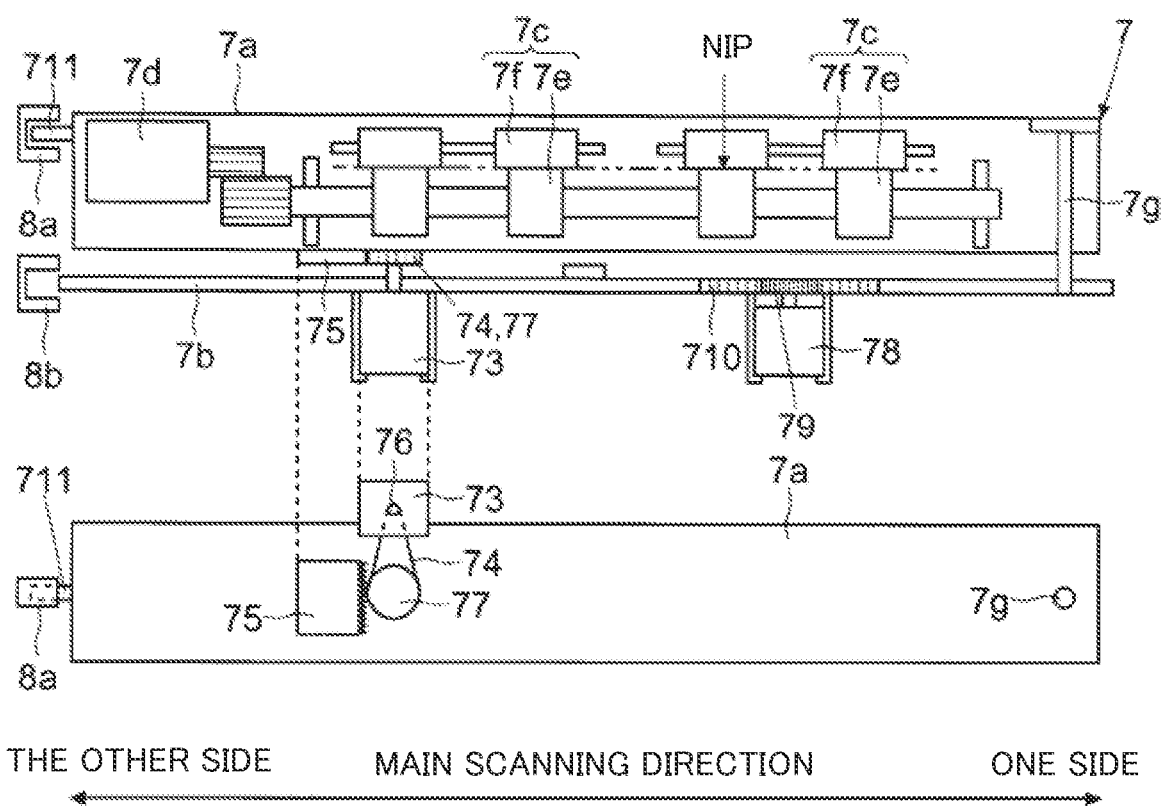
FIG. 6 is a view showing an example of a register-less unit in the embodiment.
Figure 7:
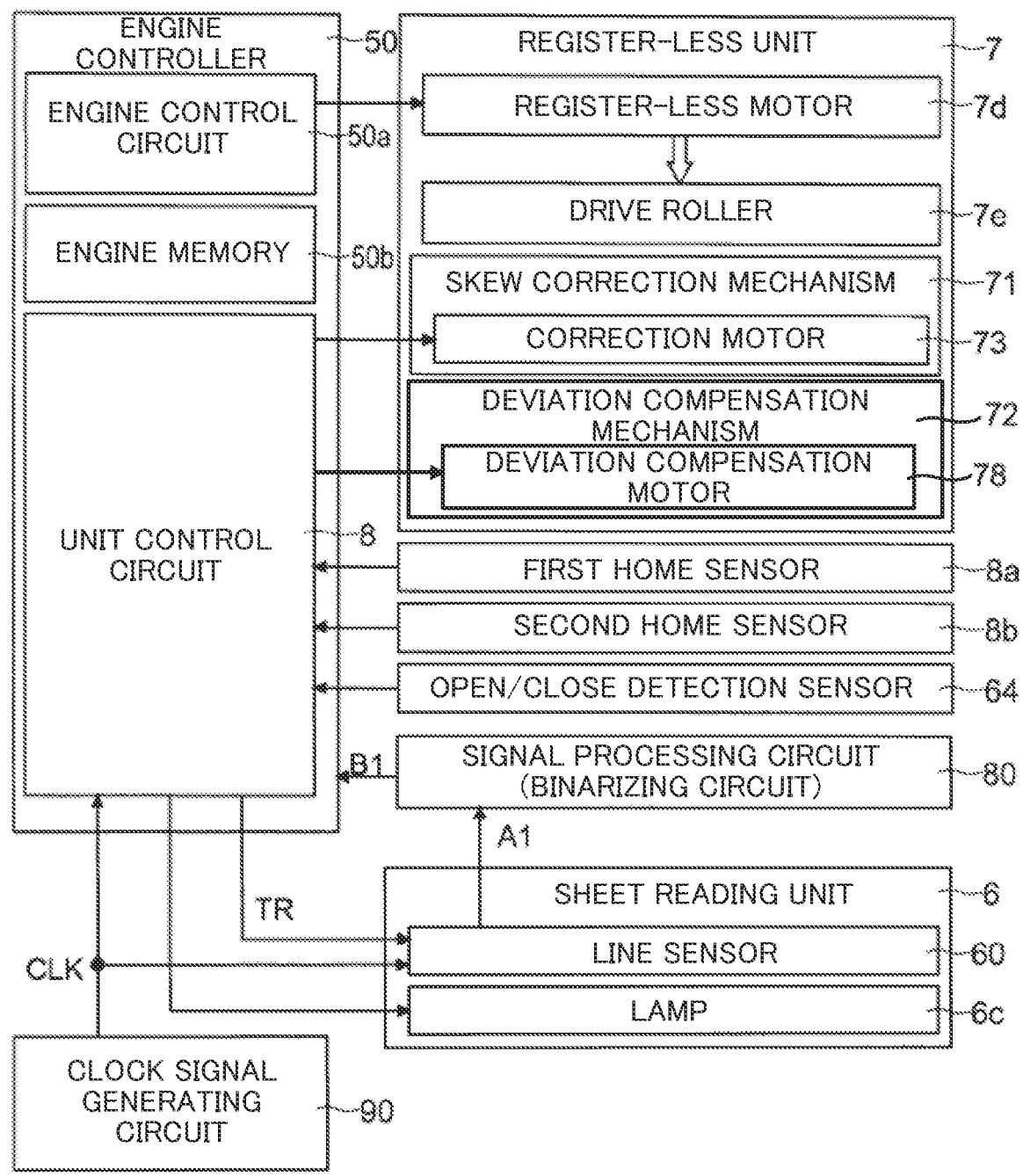
FIG. 7 is a block diagram showing an example of the multifunction peripheral according to the embodiment.

Next, a description will be given of examples of a sheet reading unit 6 and a register-less unit 7 in the embodiment with reference to FIGS. 4 to 7. FIG. 4 is a view showing examples of the units contained in the multifunction peripheral 100 according to the embodiment. FIG. 5 is a view showing an example of the sheet reading unit 8 in the embodiment. FIG. 6 is a view showing an example of the register-less unit 7 in the embodiment. FIG. 7 is a block diagram showing an example of the multifunction peripheral 100 according to the embodiment.

The multifunction peripheral 100 includes the sheet reading unit 6 and the register-less unit 7. The sheet reading unit 6 is provided in the sheet conveyance path. The sheet reading unit 6 reads a sheet being conveyed. The sheet reading unit 6 is provided upstream of the image forming device 5c (the secondary transfer roller 57) in the direction of sheet conveyance (see FIG. 2).

As shown in FIG. 5, a light-transmissive plate 6b is mounted to the sheet reading unit 6 to form one surface of the sheet reading unit 6. The light-transmissive plate 6b is a glass plate or a light-transmissive resin plate. A lamp 6c, a lens 6d, and a line sensor 60 are housed in an enclosed space formed by a housing 6a and the light-transmissive plate 6b. The sheet reading unit 6 is a CIS scanner unit.

As shown in FIG. 7, the engine controller 50 includes an engine control circuit 50a and a unit control circuit 8. The engine control circuit 50a and the unit control circuit 8 are formed of, for example, a CPU. The unit control circuit 8 performs predetermined processing in response to an instruction from the engine control circuit 50a. The following description is given of an example where the unit control circuit 8 controls the sheet reading unit 6 and the register-less unit 7. The engine control circuit 50a may control the operation of one of the sheet reading unit 6 and the register-less unit 7 or control the operations of both the sheet reading unit 6 and the register-less unit 7.

FIG. 5 is a view when the sheet conveyance path is viewed from a direction perpendicular to the direction of sheet conveyance. In executing a print job, the unit control circuit 8 supplies electric current to the lamp 6c to turn on the lamp 6c. FIG. 5 shows an example where the sheet reading unit 6 includes two lamps 6c. The lamps 6c emit light along a main scanning direction. The lamps 6c are, for example, LED lamps.

The line sensor 60 includes a plurality of pixels (light-receiving elements or photoelectric conversion elements). The pixels are arranged in the main scanning direction. As shown in FIG. 5, light emitted from the lamps 6c and reflected on an original document passes through the lens 6d and then enters the pixels of the line sensor 60. During conveyance of a sheet (in a print job), the unit control circuit 8 allows the line sensor 60 to read the sheet.

A line sensor divided into three blocks can be used as the line sensor 60. In other words, a line sensor composed of a combination of three sensors for line reading can be used as the line sensor 60. Each of the three blocks includes a plurality of pixels. For convenience sake, three blocks are referred to as a first block 61, a second block 62, and a third block 63 starting from one side in the main scanning direction (the right side in FIG. 4 or the side closest to a fulcrum shaft 7g of a below-described register-less unit 7, hereinafter also termed a fulcrum shaft side). In the multi-function peripheral 100, each sheet is fed by a central feeding method. Specifically, each sheet is regulated in position in the sheet feed device 5a and conveyed by the sheet conveying device 5b so that the center of the sheet conveyance path in the main scanning direction coincides with the center of the sheet being conveyed in the main scanning direction. The broken line in FIG. 4 is a line indicating the centers of the sheet and the sheet conveyance path in the main scanning direction.

The third block 63 is provided at a location where the center of the sheet in the main scanning direction can be read. The first block 61 is provided at a location where, when, among different types of printable sheets, sheets of the type having the maximum width in the main scanning direction are used, one ends of the sheets in the main scanning direction can be read.

The unit control circuit 8 provides a trigger signal TR to the line sensor 60. The line sensor 60 includes a charge transfer circuit (a shift register or a transfer CCD). Upon receiving the trigger signal TR, the charges stored in the pixels are transferred to the charge transfer circuit. The charge transfer circuit converts the charges to voltages.

The multifunction peripheral 100 includes a clock signal generating circuit 90. The clock signal generating circuit 90 generates a read clock signal CLK. The clock signal generating circuit 90 provides a read clock signal CLK to the line sensor 60. Each of the blocks outputs an analog picture signal A1 of one pixel in response to each single read clock signal CLK. The frequency of the read clock signal CLK is set at a value at which the analog picture signals A1 of all the pixels can be sent in each period of the trigger signal TR.

The register-less unit 7 is provided at a location where a pair of registration rollers would be provided in a conventional image forming apparatus (see FIG. 2). In the conventional image forming apparatus, the pair of registration rollers are stopping at the initial moment when the leading end of a sheet reaches them. When the sheet butts against the stopping pair of registration rollers, skew of the sheet is corrected. However, with the use of the pair of registration rollers, each sheet is temporarily stopped. Unlike the above, the register-less unit 7 corrects skew of a sheet without stopping the sheet and immediately conveys the sheet downstream. The register-less unit 7 is provided upstream of the image forming device 5c (a secondary transfer nip 5n, the secondary transfer roller 57, and an image forming position) in the direction of sheet conveyance (see FIG. 2). The register-less unit 7 is provided downstream of the sheet reading unit 6 in the direction of sheet conveyance.

FIG. 6 shows an example of the register-less unit 7. As shown in FIG. 6, the register-less unit 7 includes a case 7a and a movable plate 7b. A clearance is provided between the case 7a and the movable plate 7b. In the example shown in FIG. 6, the case 7a has a box shape. The movable plate 7b has a plate-like shape. The longitudinal direction of both the case 7a and the movable plate 7b is the main scanning direction. The movable plate 7b and the bottom surface of the case 7a are parallel with each other. The upper part of FIG. 6 shows an example of a view of the register-less unit 7 when viewed from below in FIG. 2 (the bottom side of the multifunction peripheral 100). The lower part of FIG. 6 is a view showing a surface of the case 7a facing the movable plate 7b (wherein the movable plate 7b is not shown).

The case 7a contains pairs of register-less rollers 7c and a register-less motor 7d. Each of the pairs of register-less rollers 7c includes a drive roller 7e and a driven roller 7f. The axes of the drive roller 7e and the driven roller 7f are parallel with each other. The peripheral surface of the drive roller 7e is in contact with the peripheral surface of the driven roller 7f. As shown in FIG. 2, a sheet is conveyed upward from below. A sheet being conveyed enters a nip between the drive roller 7e and the driven roller 7f. The drive force of the register-less motor 7d is transmitted through a plurality of gears to the drive roller 7e. When the register-less motor 7d is rotated, the pairs of register-less rollers 7c rotate. By the rotation of the pairs of register-less rollers 7c, the sheet being conveyed passes through the register-less unit 7 (the nip).

A fulcrum shaft 7g (a fulcrum and a pivot shaft) is provided on the movable plate 7b. One end of the fulcrum shaft 7g is fixedly inserted into the movable plate 7b. The fulcrum shaft 7g stands upright from the flat surface of the movable plate 7b. The other end of the fulcrum shaft 7g is inserted into one end of the case 7a in the main scanning direction (the direction perpendicular to the direction of sheet conveyance). The other end of the case 7a (a part of the register-less unit 7) can be swung on the fulcrum shaft 7g. In other words, the case 7a (a part of the register-less unit 7) can be rotated. As shown by the solid arrow in FIG. 4, the other end of the case 7a can be swung downstream or upstream in the direction of sheet conveyance.

The register-less unit 7 includes a skew correction mechanism 71 and a deviation compensation mechanism 72. In order to correct skew of a sheet being conveyed, the skew correction mechanism 71 moves an end of the register-less unit 7 located on the other side thereof (a movable side thereof). The skew correction mechanism 71 includes a correction motor 73, a correction belt 74, and a correction toothed member 75.

The correction motor 73 is, for example, a stepping motor. The correction motor 73 is mounted to the movable plate 7b. The correction motor 73 is rotatable in normal and reverse directions. A first correction gear 76 is provided on a shaft of the correction motor 73. The correction toothed member 75 (a rack) is mounted on the surface of the case 7a facing the movable plate 7b. The teeth of the correction toothed member 75 are aligned along the direction of sheet conveyance. The correction toothed member 75 meshes with a second correction gear 77. The correction belt 74 is mounted around the first correction gear 76 and the second correction gear 77. When the correction motor 73 is rotated, the first correction gear 76, the correction belt 74, and the second correction gear 77 rotate. As a result, the case 7a with the correction toothed member 75 mounted thereon rotates around the fulcrum shaft 7g.

The other end side of the register-less unit 7 (the case 7a and the pairs of register-less rollers 7c) can be moved in the direction of sheet conveyance. The amount of movement of the other end of the register-less unit 7 (the case 7a) produced by the skew correction mechanism 71 is sufficient to be a few millimeters to about 5 millimeters upstream in the direction of conveyance and a few millimeters to about 5 millimeters downstream in the direction of conveyance, both from a first home position (a first reference position). The details of the first home position will be described hereinafter.

The deviation compensation mechanism 72 includes a deviation compensation motor 78. The deviation compensation motor 78 is, for example, a stepping motor. The deviation compensation motor 78 is mounted to the movable plate 7b. The deviation compensation motor 78 is rotatable in normal and reverse directions. A deviation compensation gear 79 is provided on a shaft of the deviation compensation motor 78.

The deviation compensation gear 79 meshes with a compensation toothed member 710 (a rack) formed at an edge of the movable plate 7b. When the deviation compensation motor 78 is rotated, the deviation compensation gear 79 rotates.

As a result, the register-less unit 7 (the movable plate 7b and the case 7a) moves in the main scanning direction. The amount of deviation of a sheet being conveyed in the main scanning direction is only a few millimeters at maximum. The range of movement of the register-less unit 7 in the main scanning direction produced by the deviation compensation mechanism 72 is sufficient to be a few millimeters to about 5 millimeters in one of two ways in the main scanning direction and a few millimeters to about 5 millimeters in the other way in the main scanning direction, both from a second home position (a second reference position).

Next, a description will be given of the first home position. The first home position is the position (angle) of the case 7a at which the axial direction of the pairs of register-less rollers 7c is parallel with the main scanning direction. The first home position is a position where the pairs of register-less rollers 7c can feed a sheet without skew (in parallel with the direction of sheet conveyance). For the purpose of placing the register-less unit 7 (the case 7a) in the first home position, a first home sensor 8a is provided. The first home sensor 8a is a sensor for use in aligning the position of the case 7a in the direction of rotation with the first home position.

For example, a transmissive photosensor can be used as the first home sensor 8a. In this case, the first home sensor 8a includes a light-emitting element and a light-receiving element. A clearance is provided between the light-emitting surface of the light-emitting element and the light-receiving surface of the light-receiving element. The output level (output voltage value) of the light-receiving element varies with the amount of light received from the light-emitting element. A detecting projection 711 is provided on the register-less unit 7 (the case 7a). FIG. 6 shows an example where the detecting projection 711 is provided at an end of the case 7a located on the other side (hereinafter also termed a movable side) thereof in the main scanning direction. The first home sensor 8a is disposed opposite to the detecting projection 711. When the register-less unit 7 (the case 7a) is rotated, the detecting projection 711 passes through the clearance in the first home sensor 8a. The detecting projection 711 having entered the clearance blocks an optical path from the light-emitting element to the light-receiving element.

The output of the first home sensor 8a (the light-receiving element) is input to the unit control circuit 8. The unit control circuit 8 recognizes the output level of the first home sensor 8a (the light-receiving element). Based on a point in time when, after the correction motor 73 is activated, the output level of the first home sensor 8 reaches a level indicating that the first home sensor 8a has detected the detecting projection 711, the unit control circuit 8 places the register-less unit 7 (the case 7a) in the first home position. For example, the unit control circuit 8 rotates the correction motor 73 reversely to lift the case 7a. At the point in time when the output level of the first home sensor 8a reaches a level indicating that the first home sensor 8a has detected the detecting projection 711, the unit control circuit 8 rotates the correction motor 73 in the normal direction. After rotating the correction motor 73 a predetermined number of pulses in the normal direction, the unit control circuit 8 stops the correction motor 73. When the correction motor 73 stops, the register-less unit 7 (the case 7a) is placed in the first home position.

For example, when the multifunction peripheral 100 is started up at switch-on of a main power supply or when it is returned to an active mode (a printable mode or a normal mode) by cancellation of a power-saving mode, the unit control circuit 8 places the register-less unit 7 (the case 7a) in the first home position.

As shown in FIG. 2, the register-less unit 7 is disposed so that a sheet can pass through it upward from below. Therefore, when the correction motor 73 is not energized, the other side of the case 7a in the main scanning direction tends to tilt down under its own weight (see FIG. 2). In maintaining the case 7a in the first home position, the unit control circuit 8 energizes the correction motor 73. Thus, the position of the register-less unit 7 (the case 7a) can be maintained.

The register-less unit 7 can also be moved in the main scanning direction. To this end, the second home position is also preset. The second home position is a home position of the movable plate 7b (the register-less unit 7) in the main scanning direction. For example, the middle of the range of movement of the register-less unit 7 (the movable plate 7b) in the main scanning direction may be set as the second home position. The second home position is a position where the register-less unit 7 (the movable plate 7b) can move both ways in the main scanning direction.

For the purpose of placing the register-less unit 7 (the movable plate 7b) in the second home position, a second home sensor 8b is provided. The second home sensor 8b may be provided at an end of the movable plate 7b located on the other side thereof in the main scanning direction (or may be provided at an end thereof located on the one side).

For example, a transmissive photosensor can be used as the second home sensor 8b. In this case, the second home sensor 8b includes a light-emitting element and a light-receiving element. A clearance is provided between the light-emitting surface of the light-emitting element and the light-receiving surface of the light-receiving element. The output level (output voltage value) of the light-receiving element varies with the amount of light received from the light-emitting element.

The second home sensor 8b is provided at a location where when the register-less unit 7 moves furthest in the other way in the main scanning direction, the end of the movable plate 7b on the other side in the main scanning direction enters the clearance. The second home sensor 8b is a sensor for use in detecting that the register-less unit 7 (the movable plate 7b) has moved furthest in the other way in the main scanning direction.

The output of the second home sensor 8b (the light-receiving element) is input to the unit control circuit 8. The unit control circuit 8 recognizes the output level of the second home sensor 8b (the light-receiving element). In placing the register-less unit 7 (the movable plate 7b) in the second home position, the unit control circuit 8 activates the deviation compensation motor 78 and allows it to move the movable plate 7b in the other way in the main scanning direction. When the output level of the second home sensor 8b reaches a level indicating that the second home sensor 8b has detected the end of the movable plate 7b in the main scanning direction, the unit control circuit 8 moves the register-less unit 7 (the movable plate 7b) a predetermined distance in the one way in the main scanning direction toward the middle of the range of movement thereof in the main scanning direction.

(Signal Processing Circuit 80)

Figure 8:
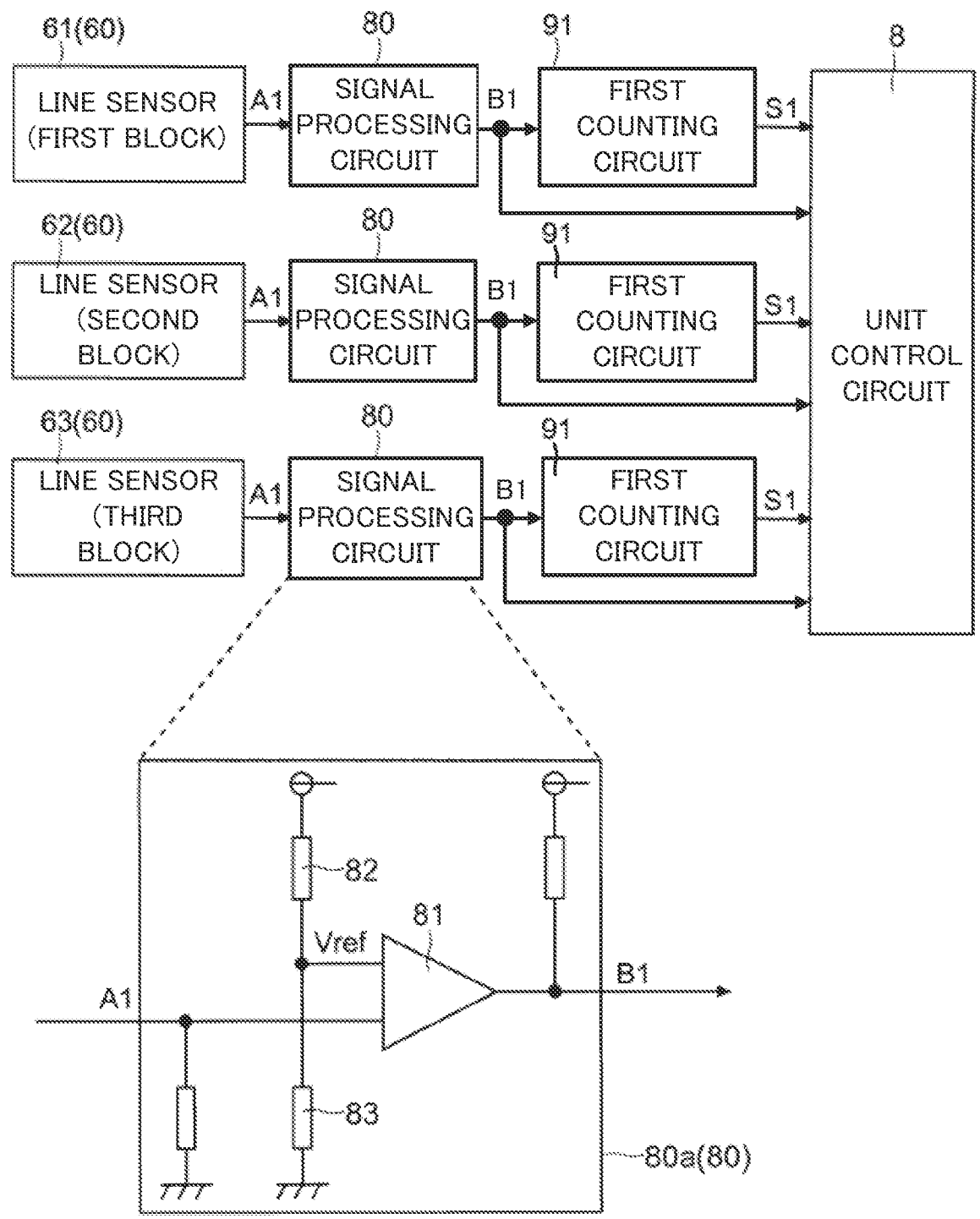
FIG. 8 is a diagram showing examples of circuits contained in the multifunction peripheral according to the embodiment.
Figure 9:
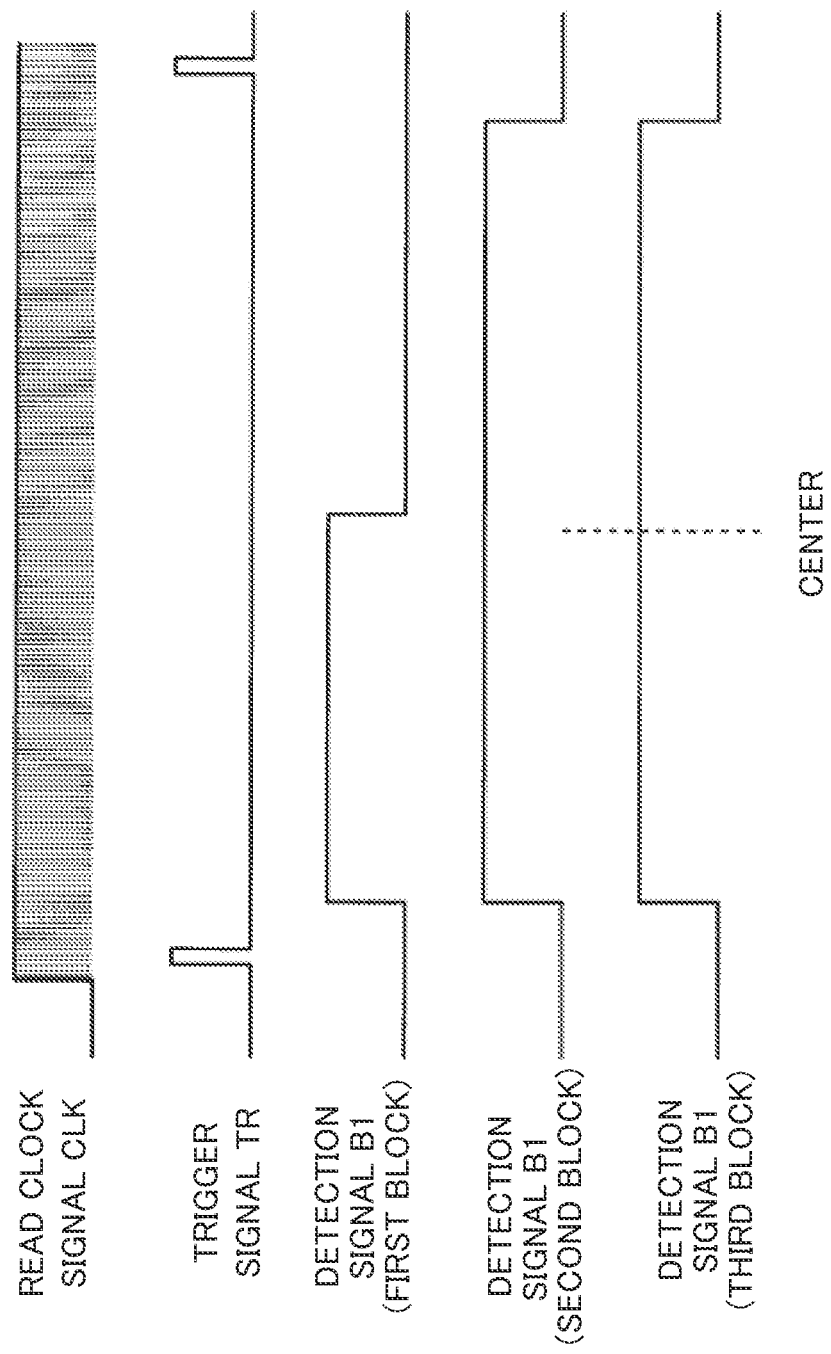
FIG. 9 shows an example of a timing diagram of signals when the sheet reading unit in the embodiment has read a sheet.

Next, a description will be given of an example of a signal processing circuit 80 in the embodiment with reference to FIGS. 8 and 9. FIG. 8 is a diagram showing an example of circuits contained in the multifunction peripheral 100 according to the embodiment. FIG. 9 shows an example of a timing diagram of signals when the sheet reading unit 6 in the embodiment has read a sheet being conveyed.

The multifunction peripheral 100 includes a signal processing circuit 80. The signal processing circuit 80 processes and converts an analog picture signal A1 output by the line sensor 60 to generate a detection signal B1. The detection signal B1 is a signal indicating whether or not a reflecting object on the sheet reading unit 6 (the light-transmissive plate 6b) has been read.

An example of the reflecting object in this description is a sheet being conveyed. The reflecting object also includes a foreign substance on the light-transmissive plate 6b. The foreign substance is a reflecting object attached to the light-transmissive plate 6b, apart from the sheet, and, for example, paper powder, toner powder or dust. The sheet and the foreign substance reflect light from the lamps 6c. On the other hand, light is not reflected on a portion of the light-transmissive plate 6b on which neither sheet nor foreign substance is present. Therefore, a pixel having read a reflecting object increases the amount of charge stored therein.

In other words, the voltage value of the analog picture signal A1 of the pixel having read a reflecting object becomes high. A higher voltage value of the analog picture signal A1 means a lighter (whiter or paler) object read by the pixel. Conversely, the voltage value of the analog picture signal A1 of a pixel having read a reflecting object-free portion becomes low. The voltage value of the analog picture signal A1 of a pixel having read a reflecting object is higher than the voltage value of the analog picture signal A1 of a pixel having not read any reflecting object.

Based on an analog picture signal A1 of each pixel, the signal processing circuit 80 generates a detection signal B1. Specifically, the multifunction peripheral 100 includes a binarizing circuit 80a as the signal processing circuit 80. In this description, the detection signal B1 is a binarized signal. The analog picture signal A1 of each pixel is converted to a detection signal B1 which is a binarized signal.

When the voltage value of an analog picture signal A1 is larger than a predetermined threshold value Vref, the signal processing circuit 80 (the binarizing circuit 80a) outputs a detection signal B1 at a High level. When the voltage value of an analog picture signal A1 is not larger than the predetermined threshold value Vref, the signal processing circuit 80 (the binarizing circuit 80a) outputs a detection signal B1 at a Low level. By the binarization, monochrome image data (one bit per pixel) can be obtained as a detection signal B1.

As described previously, the line sensor 60 includes three blocks (the first block 61, the second block 62, and the third block 63). The signal processing circuit 80 (the binarizing circuit 80a) is provided for each block. An analog picture signal A1 of each pixel of the first block 61 is input to the first signal processing circuit 80. An analog picture signal A1 of each pixel of the second block 62 is input to the second signal processing circuit 80. An analog picture signal A1 of each pixel of the third block 63 is input to the third signal processing circuit 80.

The binarizing circuits 80a included in the signal processing circuits 80 have the same structure. An example of the binarizing circuit 80a is shown in the lower part of FIG. 8. The binarizing circuit 80a includes a comparator 81 and a plurality of resistors. The outputs (analog picture signals A1) of the line sensor 60 are input, on a pixel-by-pixel basis and in order of sequence of pixels, to one of two input terminals of the comparator 81. A reference voltage (a threshold value Vref) generated by voltage dividing of a first resistor 82 and a second resistor 83 is input to the other terminal of the comparator 81.

The comparator 81 binarizes the analog picture signal A1. When the voltage value of an analog picture signal A1 is larger than the reference voltage, the comparator 81 outputs a detection signal B1 at a High level. The High level is a level indicating that a reflecting object has been read. When the voltage value of an analog picture signal A1 is not larger than the reference voltage, the comparator 81 outputs a detection signal B1 at a Low level. The Low level is a level indicating that no reflecting object has been read.

The outputs (detection signals B1) of each signal processing circuit 80 are input to the unit control circuit 8. The unit control circuit 8 acquires binary image data (monochrome image data or read-on-conveyance image data) generated by each signal processing circuit 80. The unit control circuit 8 can recognize what number pixel of each block is at a High level and what number pixel of each block is at a Low level. Based on the read-on-conveyance image data, the unit control circuit 8 can recognize (determine), for example, the direction and angle of tilt of the sheet being conveyed.

FIG. 9 shows examples of signals output by the individual signal processing circuits 80 when a line on a sheet being conveyed has been read. The top row of the timing diagram in FIG. 9 shows read clock signals CLK. The frequency of the read clock signals CLK is, for example, a few MHz or more. The second top row of the timing diagram in FIG. 9 shows an example of trigger signals TR. The third top row of the timing diagram in FIG. 9 shows an example of a waveform of detection signals B1 based on analog picture signals A1 from the first block 61. The fourth top row of the timing diagram in FIG. 9 shows an example of a waveform of detection signals B1 based on analog picture signals A1 from the second block 62. The bottom row of the timing diagram in FIG. 9 shows an example of a waveform of detection signals B1 based on analog picture signals A1 from the third block 63. The broken line in the bottom row of the timing diagram shows the position of a pixel located in the centers of a sheet and the sheet conveyance path in the main scanning direction.

(Recognition of Angle of Tilt of Sheet being Conveyed)

Next, a description will be given of an example of recognition of the angle of tilt of a sheet being conveyed based on read-on-conveyance image data. In order to determine an angle θ of tilt of a sheet being conveyed, two pixels (reference point pixels) are predetermined. For sake of specifications, the reference point pixels are provided within a reading range for a minimum-size sheet for use in printing. For example, the distance between the reference point pixels in the main scanning direction may be larger than a half of the width of the printable minimum-size sheet in the main scanning direction.

When the two reference point pixels are equal in point in time (a line) when they have captured a leading end of a sheet being conveyed (when the level of the detection signal B1 has changed to the High level), the unit control circuit 8 recognizes the angle θ of tilt as zero. When the detection signal B1 associated with one of the two reference point pixels reaches the High level ahead of the other, the unit control circuit 8 recognizes that the sheet being conveyed is skewed. When the detection signal B1 associated with the reference point pixel located on one side in the main scanning direction reaches the High level ahead of the other reference point pixel, the unit control circuit 8 recognizes that the sheet being conveyed is skewed in such a direction that a corner of the sheet located on the one side in the main scanning direction projects downstream. When the detection signal B1 associated with the reference point pixel located on the other side in the main scanning direction reaches the High level ahead of the other reference point pixel, the unit control circuit 8 recognizes that the sheet being conveyed is skewed in such a direction that a corner of the sheet located on the other side in the main scanning direction projects downstream.

When the sheet being conveyed is skewed, the unit control circuit 8 performs the calculation of arc tangent ($\tan^{-1}$) to determine an angle θ of tilt. Specifically, the unit control circuit 8 performs the following calculation.

$$\text{Angle θ of tilt} = \tan^{-1}(a/b)$$

In the above equation, the parameter a represents the distance of conveyance of a sheet from when one reference point pixel reaches the High level to when the other reference point pixel reaches the High level. For example, the unit control circuit 8 determines the parameter a by multiplying the number of lines from when one reference point pixel reaches the High level to when the other reference point pixel reaches the High level by the period of one line and the rate of conveyance of a sheet per unit time. The parameter b represents a component of the distance between the two reference point pixels in the main scanning direction (the distance between them in the main scanning direction). The parameter b can be obtained by multiplying the number of pixels from the one reference point pixel to the other reference point pixel by the pitch of pixels. The angle θ of tilt is determined based on a right triangle with height a and base b.

(Recognition of Amount of Deviation of Sheet Being Conveyed in Main Scanning Direction)

Next, a description will be given of an example of recognition of the amount of deviation of a sheet being conveyed in the main scanning direction based on read-on-conveyance image data. Since the central feeding method is employed, the location where an edge of a sheet passes is already determined by sheet size. In other words, unless the position of a sheet being conveyed deviates in the main scanning direction, the position of a pixel that should read a sheet edge is already determined.

The unit control circuit 8 recognizes, from read-on-conveyance image data, the position of a High-level pixel located furthest in the main scanning direction. Then, the storage device 2 stores, in a non-volatile manner, data (amount-of-deviation recognizing data DO) in which, for each sheet size, the position of a pixel located at the sheet edge when the sheet does not deviate in the main scanning direction is defined (see FIG. 1). The unit control circuit 8 recognizes in which direction and by what number of pixels the position of a low-darkness furthest pixel deviates from the pixel position defined in the amount-of-deviation recognizing data DO. The unit control circuit 8 can recognize the direction of deviation of the sheet (toward which of one side and the other side in the main scanning direction the sheet deviates). Furthermore, the unit control circuit 8 determines the amount of deviation of the sheet in the main scanning direction by multiplying the number of pixels deviating from the pixel position defined in the amount-of-deviation recognizing data DO by the pitch of pixels in the read-on-conveyance image data.

(Skew Correction and Deviation Compensation)

Figure 10:
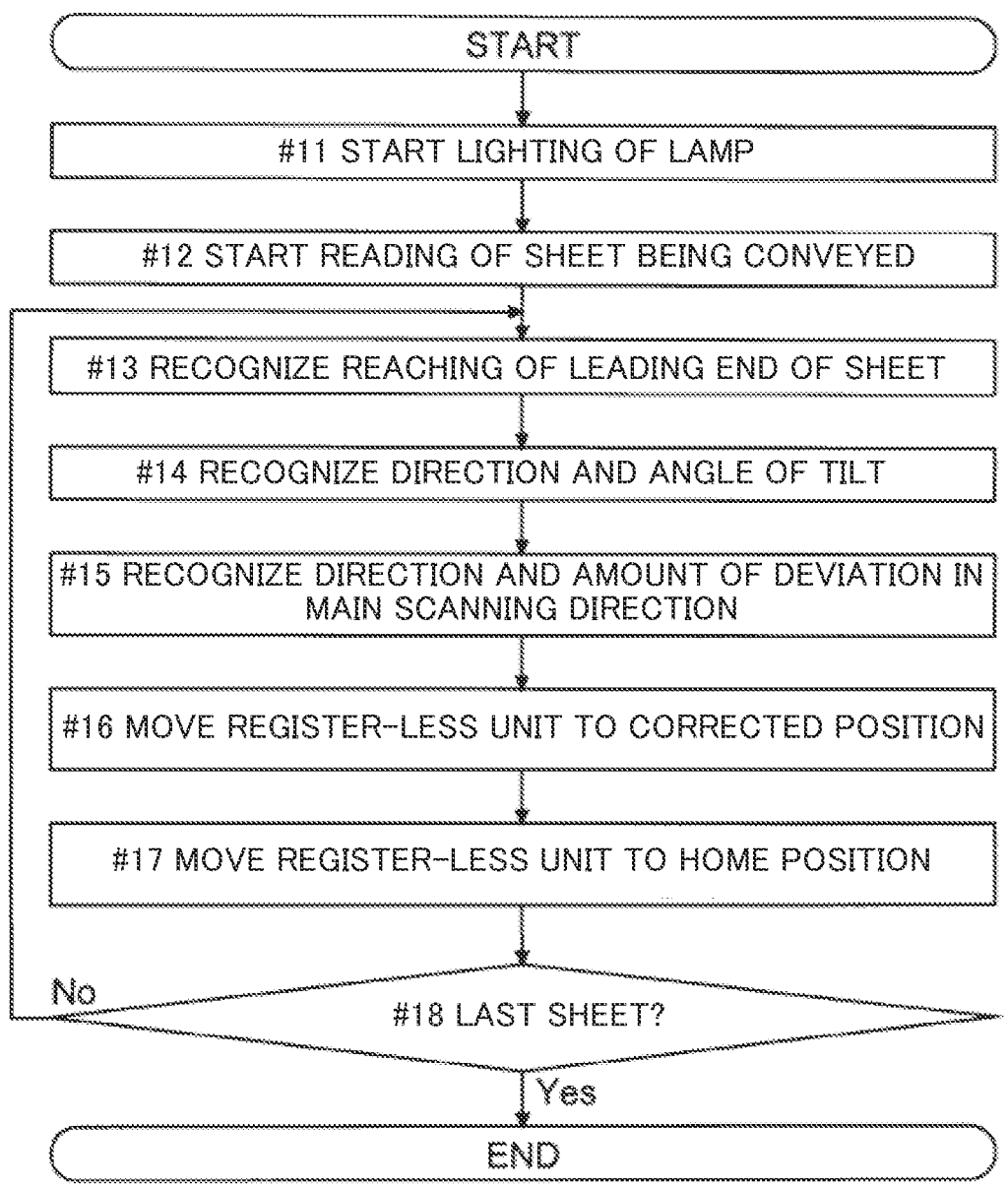
FIG. 10 is a flowchart showing an example of skew correction and deviation compensation in the multifunction peripheral according to the embodiment.

Next, a description will be given of an example of a process of skew correction and deviation compensation in the multifunction peripheral 100 according to the embodiment with reference to FIG. 10. FIG. 10 is a flowchart showing an example of a process of skew correction and deviation compensation in the multifunction peripheral 100 according to the embodiment.

In FIG. 10, "START" represents the starting point of a point job. During the print job, the unit control circuit 8 allows the sheet reading unit 6 to read sheets being conveyed. For example, when the feed of a first sheet is started (the rotation of the sheet feed roller starts), the unit control circuit 8 starts the lighting of the lamps 6c (step #11). The unit control circuit 8 starts current supply to the lamps 6c. Furthermore, the unit control circuit 8 allows the line sensor 60 to start reading (step #12). The unit control circuit 8 starts the input of a trigger signal TR and a read clock signal CLK to the line sensor 60.

Based on detection signals B1 output by the signal processing circuits 80, the unit control circuit 8 recognizes that the leading end (downstream end) of the sheet being conveyed has reached the sheet reading unit 6 (step #13). Next, based on read-on-conveyance image data, the unit control circuit 8 recognizes the direction of tilt and angle θ of tilt of the sheet being read (step #14). Furthermore, based on the read-on-conveyance image data, the unit control circuit 8 recognizes the direction of deviation and amount of deviation of the sheet being read in the main scanning direction (step #15).

Then, the unit control circuit 8 moves the register-less unit 7 (the case 7a) from the home positions to a corrected position (step #16). The unit control circuit 8 completes the movement of the register-less unit 7 (the case 7a) to the corrected position before the sheet enters the register-less unit 7 (the pairs of register-less rollers 7c).

(1) When Sheet Corner on One Side (Fulcrum Shaft Side) in Main Scanning Direction Projects Downstream in Direction of Conveyance Before the leading end of the sheet being conveyed reaches the register-less unit 7, the unit control circuit 8 moves the other end (movable end) of the register-less unit 7 (the case 7a) upstream in the direction of sheet conveyance. The corrected position is a position where the register-less unit 7 has been moved (rotated) the same angle as the angle θ of tilt from the first home position.

(2) When Sheet Corner on the Other Side (Movable Side) in Main Scanning Direction Projects Downstream in Direction of Conveyance Before the leading end of the sheet being conveyed reaches the register-less unit 7, the unit control circuit 8 moves the other end of the register-less unit 7 (the case 7a) downstream in the direction of sheet conveyance. The corrected position is a position where the register-less unit 7 has been moved (rotated) the same angle as the angle θ of tilt from the first home position.

(3) When Sheet Deviates Toward One Side (Fulcrum Shaft Side) in Main Scanning Direction Before the leading end of the sheet being conveyed reaches the register-less unit 7, the unit control circuit 8 moves the register-less unit 7 (the movable plate 7b) the recognized amount of deviation in the one way in the main scanning direction.

(4) When Sheet Deviates Toward the Other Side (Movable Side) in Main Scanning Direction Before the leading end of the sheet being conveyed reaches the register-less unit 7, the unit control circuit 8 moves the register-less unit 7 (the movable plate 7b) the recognized amount of deviation in the other way in the main scanning direction.

After the sheet enters the pairs of register-less rollers 7c, the unit control circuit 8 moves the register-less unit 7 (the case 7a) from the corrected position to the first home position and the second home position (step #17). After the sheet enters the register-less unit 7 and before the sheet being conveyed reaches the secondary transfer nip 5n, the unit control circuit 8 completes the movement of the register-less unit 7 to both the home positions. By the return of the register-less unit 7 to the home positions, skew and deviation of the sheet being conveyed can be corrected while the sheet conveyance is continued.

After step #17, the unit control circuit 8 confirms whether or not the last sheet in the print job has been read (step #18). In other words, the unit control circuit 8 confirms whether or not the last sheet has passed through the sheet reading unit 6.

If the sheet having passed through the sheet reading unit 6 is not the last sheet (No in step #18), the unit control circuit 8 executes the processing step #13 for the next sheet (that is, the processing goes back to step #13). A sheet interval is provided between sheets being conveyed. In the sheet interval, the unit control circuit 8 confirms, after every reading of one line, whether or not the leading end (downstream end) of the sheet being conveyed has reached the sheet reading unit 6.

If the sheet having passed through the sheet reading unit 6 is the last sheet (Yes in step #18), the unit control circuit 8 ends the processing in this flowchart (END). At the end of the flowchart, the unit control circuit 8 turns off the lamps 6c and allows the line sensor 60 to finish reading.

(Counting Circuit)

Figure 11:
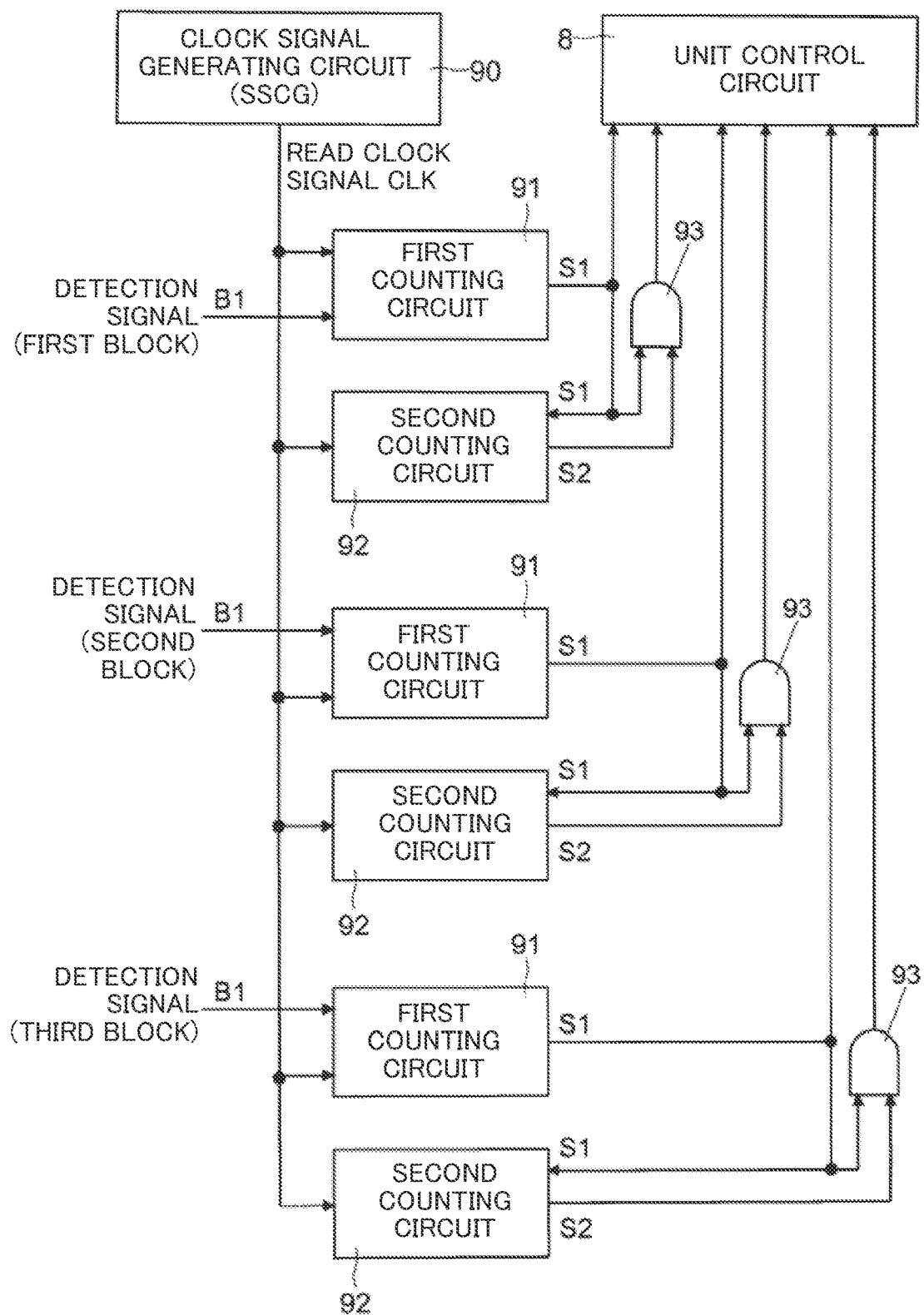
FIG. 11 is a block diagram showing examples of counting circuits contained in the multifunction peripheral according to the embodiment.

Next, a description will be given of examples of counting circuits contained in the multifunction peripheral 100 according to the embodiment with reference to FIG. 11. FIG. 11 is a diagram showing examples of counting circuits contained in the multifunction peripheral according to the embodiment.

The multifunction peripheral 100 includes a first counting circuit 91 and a second counting circuit 92. The first counting circuit 91 is a circuit for use in determining the necessity or unnecessity of cleaning of the light-transmissive plate 6b (the sheet reading unit 6). The second counting circuit 92 is a circuit for use in detecting the reaching and passing of a sheet being conveyed to and through the sheet reading unit 6.

The first counting circuit 91 will be described first. A foreign substance may adhere to the sheet reading unit 6 (the light-transmissive plate 6b). The foreign substance is, for example, paper powder, toner or dust. As described previously, the foreign substance is also a reflecting object. Paper powder is attached to a sheet. Printing is made using a toner. Therefore, paper powder or toner may adhere to the light-transmissive plate 6b. In some cases, paper sheet fibers entangle together or a plurality of paper powder particles consolidate, so that the foreign substance may grow. Toner may be entangled in paper powder.

When no sheet being conveyed is present in a reading line of the sheet reading unit 6 (when the sheet reading unit 6 has not yet read a sheet being conveyed), a pixel (a light-receiving element) having captured a foreign substance shows a larger amount of light received than pixels having not captured any foreign substance. In other words, the amount of charge stored in the pixel becomes larger. Therefore, the level (voltage value) of the analog picture signal A1 of the pixel having captured a foreign substance is larger than the levels of the analog picture signals A1 of the pixels having not captured any foreign substance. The voltage value of the analog picture signals A1 of the pixels having not captured any foreign substance indicates that the color as the reading result is dark (black or dense). On the other hand, the voltage value of the analog picture signal A1 of the pixel having read a foreign substance indicates that the color as the reading result is light (white or pale).

The comparator 81 binarizes the analog picture signal A1. The High level of the detection signal B1 when no sheet is being conveyed (when a sheet being conveyed has not been read) means that a foreign substance has been read. Because of the presence of a foreign substance, it may be falsely recognized that, in spite of a sheet-free area, a sheet is present. The angle of tilt may be recognized incorrectly. Particularly, if the foreign substance is large, false or incorrect recognition is likely to occur.

It is preferred to detect the adhesion of a foreign substance to the sheet reading unit 6 (the light-transmissive plate 6b). To this end, the multifunction peripheral 100 includes the first counting circuit 91. The first counting circuit 91 generates a first detection result signal S1 based on an analog picture signal A1 output by the line sensor 60 and its associated detection signal B1. The unit control circuit 8 determines, based on the level of the first detection result signal S1, the necessity or unnecessity of cleaning of the light-transmissive plate 6b.

For example, the first counting circuit 91 can be implemented using an integrated circuit, such as a small-size FPGA. The integrated circuit is a circuit into which a plurality of gates are integrated. The integrated circuit includes a programmable gate array. The first counting circuit 91 is set as a counter for use in measuring the time.

As described previously, the line sensor 60 includes three blocks (the first block 61, the second block 62, and the third block 63). The first counting circuit 91 is provided for each block and each signal processing circuit 80. The output (a detection signal B1) of the signal processing circuit 80 associated with the first block 61 is input to the first counting circuit 91 present in the first place. The output (a detection signal B1) of the signal processing circuit 80 associated with the second block 62 is input to the first counting circuit 91 present in the second place. The output (a detection signal B1) of the signal processing circuit 80 associated with the third block 63 is input to the first counting circuit 91 present in the third place. These first counting circuits 91 may be collectively set in a single integrated circuit. Thus, a plurality of first counting circuits 91 can be placed at low cost and in a space-saving manner.

A detection signal B1 and a read clock signal CLK are input to each first counting circuit 91. Using a read clock signal CLK, each first counting circuit 91 measures a duration time. The duration time is a time during which a level (High level) of the detection signal B1 indicating that a foreign substance on the sheet reading unit 6 has been read is continued.

For example, the first counting circuit 91 counts using a read clock signal CLK. On the rising or falling edge of a read clock signal CLK, the first counting circuit 91 confirms whether or not a detection signal B1 is at the High level. When the detection signal B1 is at the High level, the first counting circuit 91 increments the count value by one. When the detection signal B1 is at the Low level, the first counting circuit 91 resets the count value.

In this situation, an SSCG (spread spectrum clock generator) may be used as the clock signal generating circuit 90. With the use of an SSCG, electromagnetic noises from the sheet reading unit 6, the line sensor 60, and the first counting circuit 91 can be reduced. Since the line sensor 60 and the first counting circuit 91 are operated using the same clock signal, clocks counted as the duration time are consistent with associated pixels.

When the duration time reaches or exceeds a predetermined first specified time, the first counting circuit 91 changes the level of the first detection result signal S1 from a level indicating the unnecessity of cleaning to a level indicating the necessity of cleaning. In the multifunction peripheral 100, the level indicating the necessity of cleaning is the High level.

When the duration time is shorter than the first specified time, the level of the first detection result signal S1 is set at the level indicating the unnecessity of cleaning. In the multifunction peripheral 100, the level indicating the unnecessity of cleaning is the Low level. The number of clocks of the read clock signal CLK corresponding to the first specified time is predetermined. In the multifunction peripheral 100, the number of clocks of the read clock signal CLK corresponding to the first specified time is 8 clocks. In other words, the first specified time is eight times the period of a read clock signal CLK. When the detection signals B1 are at the High level for eight consecutive clocks (when the count value reaches 8), the first counting circuit 91 changes the level of the first detection result signal S1 from the Low level to the High level.

The output (the first detection result signal S1) of each first counting circuit 91 is input to the unit control circuit 8. Based on the level of the first detection result signal S1, the unit control circuit 8 determines whether or not it is necessary to clean the sheet reading unit 6.

The second counting circuit 92 will be described next. The second counting circuit 92 functions as a sensor for detecting that the leading end of a sheet being conveyed has reached the sheet reading unit 6 and that the sheet being conveyed has passed through the sheet reading unit 6. For example, after the recognition of reaching of the sheet being conveyed to the sheet reading unit 6 and before the entry of the leading end of the sheet being conveyed into the pairs of register-less rollers 7c, the unit control circuit 8 sets the positions of the case 7a and the movable plate 7b at their corrected positions. In other words, the second counting circuit 92 is used for the control of skew correction and deviation compensation.

When a correction waiting time has passed since the recognition of reaching of the leading end of a sheet being conveyed to the sheet reading unit 6, the unit control circuit 8 places the case 7a and the movable plate 7b in their home positions. The correction waiting time is set to a time longer than the time obtained by dividing the distance from the position of the sheet reading unit 6 to the pairs of register-less rollers 7c by the rate of sheet conveyance defined in the specifications.

The comparator 81 binarizes the analog picture signal A1. When during conveyance of a sheet the leading end of the sheet being conveyed reaches the sheet reading unit 6, detection signals B1 associated with a large number of pixels switch to the High level. In other words, the number of pixels having read a sheet becomes large. On the other hand, when during conveyance of the sheet the trailing end of the sheet being conveyed passes through the sheet reading unit 6, detection signals B1 associated with a large number of pixels switch to the Low level. In other words, the number of pixels having not read a sheet becomes large.

For the purpose of detecting the reaching of the leading end of a sheet being conveyed and the passing of the trailing end of the sheet, the multifunction peripheral 100 includes the second counting circuit 92. The second counting circuit 92 generates a second detection result signal S2 based on an analog picture signal A1 and a detection signal B1. The unit control circuit 8 recognizes, based on the level of the second detection result signal S2, the reaching of the leading end of a sheet being conveyed or the passing of the trailing end of the sheet.

For example, the second counting circuit 92 can also be implemented using an integrated circuit, such as a small-size FPGA. The second counting circuit 92 is set as a counter for use in measuring the time. The second counting circuit 92 may be set in the integrated circuit including the first counting circuit 91.

As described previously, the line sensor 60 includes three blocks (the first block 61, the second block 62, and the third block 63). The second counting circuit 92 is also provided for each block and each signal processing circuit 80. The output (a first detection result signal S1) of the first counting circuit 91 associated with the first block 61 is input to the second counting circuit 92 present in the first place. The output (a first detection result signal S1) of the first counting circuit 91 associated with the second block 62 is input to the second counting circuit 92 present in the second place. The output (a first detection result signal S1) of the first counting circuit 91 associated with the third block 63 is input to the second counting circuit 92 present in the third place. These second counting circuits 92 may be included in a single integrated circuit.

A read clock signal CLK is input to each second counting circuit 92. The second counting circuit 92 also counts using a read clock signal CLK. Using a read clock signal CLK, each second counting circuit 92 measures the duration time. On the rising or falling edge of a read clock signal CLK, the second counting circuit 92 confirms whether or not a first detection result signal S1 is at the High level. When the first detection result signal S1 is at the High level, the second counting circuit 92 increments the count value by one. When the first detection result signal S1 is at the Low level, the second counting circuit 92 resets the count value.

When the duration time reaches or exceeds a predetermined second specified time, the second counting circuit 92 changes the level of the second detection result signal S2 from a level indicating the absence of a sheet being conveyed to a level indicating the presence of the sheet. In the multifunction peripheral 100, the level indicating the presence of a sheet being conveyed is the High level.

In the multifunction peripheral 100, the level indicating the absence of a sheet being conveyed is the Low level. When, even if the level of the first detection result signal S1 has switched to the High level, the duration time is shorter than the second specified time, the level of the second detection result signal S1 is maintained at the level (Low level) indicating the absence of a sheet being conveyed.

The first specified time is shorter than the second specified time. The second specified time is longer than the first specified time. Therefore, before a foreign substance grows to such an extent that the reaching of the leading end of a sheet being conveyed or the passing of the trailing end of a sheet being conveyed is falsely detected, the necessity of cleaning can be detected.

The number of clocks of the read clock signal CLK corresponding to the second specified time is predetermined. In the multifunction peripheral 100, the number of clocks of the read clock signal CLK corresponding to the second specified time is 16 clocks. In other words, the second specified time is 16 times the period of a read clock signal CLK. When the detection signals B1 are at the High level for 16 consecutive clocks, the second counting circuit 92 changes the level of the second detection result signal S2 from the Low level to the High level.

Specifically, the second counting circuit 92 uses a first detection result signal S1 for counting. Therefore, when the period of time during which first detection result signals S1 exhibit the High level continues for eight pixels (8 clocks) from when the level of the first detection result signal S1 has switched to the High level, the second counting circuit 92 changes the level of the second detection result signal S2 from the Low level to the High level.

The multifunction peripheral 100 is further provided with an AND circuit 93. The AND circuit 93 is provided for each combination of a first counting circuit 91 and a second counting circuit 92. The output (a first detection result signal S1) of the first counting circuit 91 is input to one of two input terminals of the AND circuit 93. The output (a second detection result signal S2) of the second counting circuit 92 is input to the other input terminal of the AND circuit 93. The output of the AND circuit 93 is input to the unit control circuit 8. Based on the levels of signals output by the AND circuit 93, the unit control circuit 8 recognizes the reaching of the leading end of a sheet being conveyed and the passing of the trailing end of the sheet being conveyed. The unit control circuit 8 can correctly detect, regardless of noises, the reaching of a sheet being conveyed and the passing of the trailing end of the sheet.

As already described with reference to FIG. 10, in a print job, the unit control circuit 8 recognizes the reaching of the leading end of a sheet being conveyed to the sheet reading unit 6 in the multifunction peripheral 100 and the passing of the sheet through the sheet reading unit 6. Specifically, when the duration time reaches the second specified time, the second counting circuit 92 switches the level of the second detection result signal S2 to the High level (the level indicating the presence of a sheet being conveyed). If, at this point in time, the leading end of the sheet being conveyed has already reached the sheet reading unit 6, the level of the first detection result signal S1 is also the High level. As a result, the output of the AND circuit 93 switches to the High level (the level indicating the presence of a sheet being conveyed). When the output of the AND circuit 93 changes from the Low level to the High level, the unit control circuit 8 recognizes that the leading end of a sheet being conveyed has reached the sheet reading unit 6. After the recognition of the reaching of a sheet being conveyed, the unit control circuit 8 recognizes the tilt and deviation of the sheet being conveyed based on read-on-conveyance image data (monochrome image data).

When the sheet being conveyed passes across the reading line of the sheet reading unit 6 (the line sensor 60), the reflecting object disappears. Therefore, the duration time does not reach the second specified time. As a result, the second counting circuit 92 outputs a second detection result signal S2 at the Low level. The output of the AND circuit 93 changes from the High level to the Low level (the level indicating the absence of a sheet being conveyed). When the output of the AND circuit 93 changes from the High level to the Low level, the unit control circuit 8 recognizes that the sheet being conveyed has passed through the sheet reading unit 6.

(Determination of Necessity/Unnecessity of Cleaning)

Figure 12:
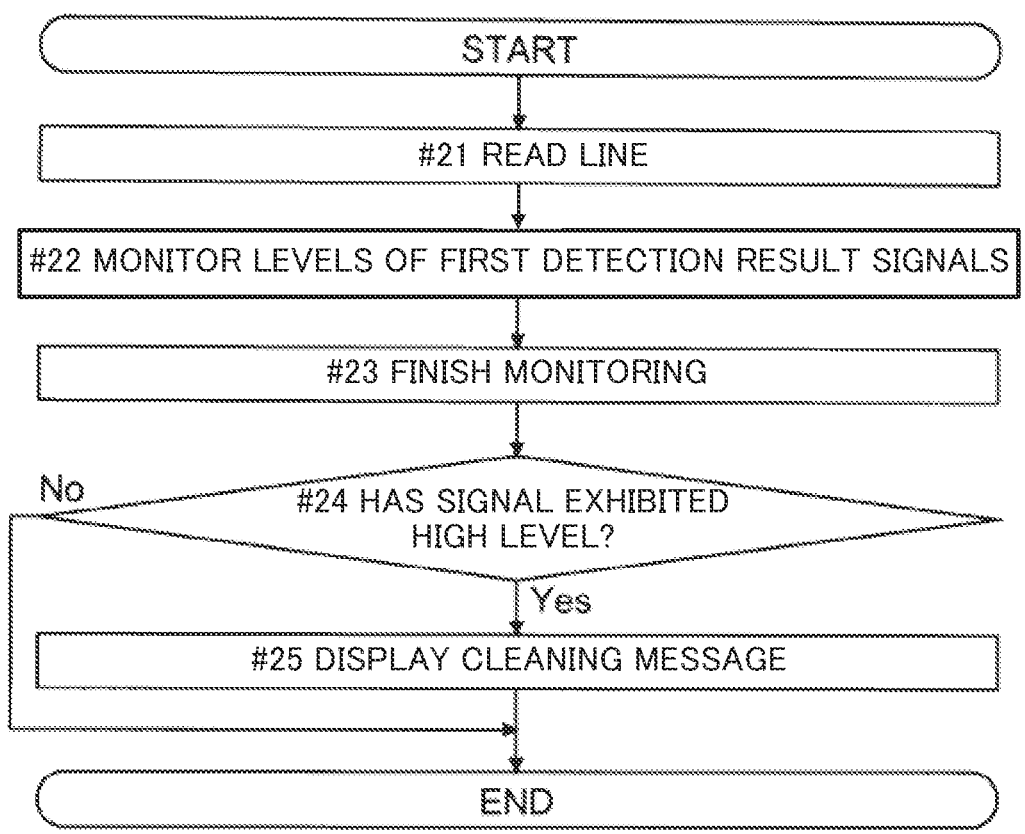
FIG. 12 is a flowchart showing an example of cleaning determination processing in the embodiment.

Next, a description will be given of an example of processing (cleaning determination processing) for determining whether or not cleaning is necessary in the multifunction peripheral 100 according to the embodiment with reference to FIG. 12. FIG. 12 is a flowchart showing an example of cleaning determination processing in the embodiment.

The unit control circuit 8 performs cleaning determination processing at a predetermined point in time. For example, when the unit control circuit 8 newly starts up, it may perform the cleaning determination processing. For example, when the main power supply of the multifunction peripheral 100 is newly switched on, the unit control circuit 8 newly starts up. For another example, when the mode of the multifunction peripheral 100 returns from the power-saving mode to the active mode (normal mode), the unit control circuit 8 newly starts up.

The multifunction peripheral 100 includes a cleaning cover that can be opened in cleaning the sheet reading unit 6. In the cleaning, the user opens the cleaning cover. With the cleaning cover open, the user does cleaning work. For example, as the cleaning work, the user wipes off a foreign substance on the surface of the light-transmissive plate 6b of the sheet reading unit 6 with a cloth or a brush. After the cleaning work, the user closes the cleaning cover. The multifunction peripheral 100 may include an open/close detection sensor 64 capable of detecting whether the cleaning cover is open or closed (see FIG. 7). The output of the open/close detection sensor 64 may be input to the unit control circuit 8. In this case, the unit control circuit 8 recognizes, based on a signal from the open/close detection sensor 64, an open state or closed state of the cleaning cover. When the open/close detection sensor 64 detects a closed state of the cleaning cover after detecting an open state of the cleaning cover, the unit control circuit 8 may perform, based on the level of the first detection result signal, the cleaning determination processing for determining whether or not the cleaning of the sheet reading unit 6 is necessary. Thus, with the timing when it is very likely that cleaning has been performed, i.e., with the timing when the opening and closing of the cleaning cover have been done, it can be determined whether or not the cleaning is completed.

Furthermore, the unit control circuit 8 may perform the cleaning determination processing before the start of a print job. Moreover, the unit control circuit 8 may perform the cleaning determination processing in intervals between sheets being conveyed (i.e., while the sheet reading unit 6 does not face a sheet being conveyed) during a print job.

In FIG. 12, "START" represents the starting point of the cleaning determination processing. First, the unit control circuit 8 allows the sheet reading unit 6 to read one line (or a few lines) (step #21). A signal (detection signal B1) based on an analog picture signal A1 acquired by the reading in the cleaning determination processing is input to the first counting circuit 91. From when a detection signal B1 associated with the first pixel is input to the first counting circuit 91 to when a detection signal B1 associated with the last pixel is input to the first counting circuit 91, the unit control circuit 8 monitors the levels of first detection result signals S1 (step #22). In the multifunction peripheral 100, the unit control circuit 8 monitors the respective levels of three sequences of first detection result signals S1 associated with the three blocks of the line sensor 60. The unit control circuit 8 is sufficient to monitor the levels of first detection result signals S1 only during reading of one line or a few lines.

When there are consecutive pixels having read a foreign substance (a reflecting object) over the first specified time, the first counting circuit 91 switches the level of the first detection result signal S1 to the High level. When there are eight consecutive pixels having an increased amount of light received because of reading of a foreign substance, the level of the first detection result signal S1 switches to the High level.

If cleaning is requested to the user in order to remove foreign substances having a size of about one pixel, the frequency of requests for cleaning may be excessively high. If the sensitivity of cleaning determination processing is excessively high, cleaning work may be requested to the user again and again. In the multifunction peripheral 100, when there are no consecutive pixels having read a foreign substance over the first specified time even if the foreign substance has been read, the first counting circuit 91 maintains the level of the first detection result signal S1 at the Low level. When a foreign substance is present, but its size is minute, the level of the first detection result signal S1 is maintained at the Low level. It is possible to avoid issuing cleaning requests with high frequency by lowering the sensitivity for detection of a foreign substance.

Thereafter, the unit control circuit 8 finishes the monitoring of changes in the levels of first detection result signals S1 (step #23). For example, when all the detection signals B1 associated with the analog picture signals A1 acquired by reading of one line for cleaning determination processing are input to the first counting circuit 91, the unit control circuit 8 finishes the monitoring.

The unit control circuit 8 confirms whether or not any one of the three sequences of first detection result signals S1 associated with the three blocks has exhibited the High level (step #24). The unit control circuit 8 recognizes that it is necessary to clean a portion of the light-transmissive plate 6b corresponding to the block associated with the first counting circuit 91 having provided a first detection result signal S1 exhibiting the High level.

If none of the three sequences of first detection result signals S1 has exhibited the High level (No in step #24), the unit control circuit 8 ends the processing (END). On the other hand, if any one of the three sequences of first detection result signals S1 has exhibited the High level (Yes in step #24), the unit control circuit 8 allows the display panel 41 to display a cleaning message for the sheet reading unit 6 (step #25). Then, the unit control circuit 8 ends the processing (END).

The cleaning message is a message requesting cleaning of the sheet reading unit 6. For example, the unit control circuit 8 sends to the controller 1 a request to display the cleaning message on the display panel 41. Upon receipt of the request to display, the controller 1 allows the display panel 41 to display the cleaning message. For example, the controller 1 allows the display panel 41 to display a cleaning message "Open the Cover and Clean the Sheet Reading Unit".

The unit control circuit 8 may notify the controller 1 of a block of the line sensor 60 a first detection result signal S1 associated with which has exhibited the High level. In this case, the controller 1 may allow the display panel 41 to display around which block of the line sensor 60 a foreign substance (a reflecting object) is present.

As thus far described, the image forming apparatus (multifunction peripheral 100) according to the embodiment includes the sheet conveying device 5b, the image forming device 5c, the sheet reading unit 6, the signal processing circuits 80, the unit control circuit 8, and the first counting circuits 91. The sheet conveying device 5b conveys a sheet. The image forming device 5c forms an image on the sheet being conveyed. The sheet reading unit 6 includes the lamps 6c and the line sensor 60 capable of reading the sheet being conveyed. The sheet reading unit 6 is provided upstream of the image forming device 5c in the direction of sheet conveyance. Based on respective analog picture signals A1 of the pixels output by the line sensor 60, the signal processing circuit 80 generates, in order of sequence of the pixels, detection signals B1 each indicating whether or not a reflecting object on the sheet reading unit 6 has been read. The first counting circuit 91 outputs a first detection result signal S1. The first counting circuit 91 measures the duration time which is a time during which the detection signals B1 maintain a level indicating that the reflecting object on the sheet reading unit 6 has been read. When the duration time reaches or exceeds the predetermined first specified time, the first counting circuit 91 changes the level of the first detection result signal S1 from a level indicating the unnecessity of cleaning to a level indicating the necessity of cleaning. When the duration time is shorter than the first specified time, the first counting circuit 91 sets the level of the first detection result signal S1 at the level indicating the unnecessity of cleaning. The unit control circuit 8 determines, based on the level of the first detection result signal S1, whether or not it is necessary to clean the sheet reading unit 6.

Even if some pixels have inconsecutively captured a reflecting object (a foreign substance), because they have not consecutively captured the reflecting object for the specified time, the level of the first detection result signal S1 is maintained at the level indicating the unnecessity of cleaning. Therefore, the number of times that the level of the first detection result signal S1 changes can be reduced. Thus, the processing load (monitoring load) on the unit control circuit 8 can be reduced. For example, the unit control circuit 8 is sufficient to confirm, with each reading of one line, whether or not a change in the level of the first detection result signal S1 has occurred. This eliminates the need to closely monitor changes in the level of the first detection result signal S1. Thus, it can be avoided to employ a high-speed, high-price CPU as the CPU 11. The number of options for the unit control circuit 8 can be increased. Furthermore, the production cost of the image forming apparatus can be reduced.

When the duration time exceeds the first specified time, the level of the first detection result signal S1 can be changed to a level indicating the necessity of cleaning. Thus, the presence of a reflecting object (a large foreign substance) likely to cause a false detection of conveyance of a sheet can be correctly detected. Meanwhile, a minute foreign substance less likely to cause a false detection of conveyance of a sheet can be ignored. Therefore, even if a minute foreign substance is present on the sheet reading unit 6, it can be avoided to request cleaning work. Thus, an excessive frequency of requests for cleaning work can be prevented.

The image forming apparatus includes the display panel 41 that displays a message requesting to clean the sheet reading unit 6 when the level of the first detection result signal S1 switches to the level indicating the necessity of cleaning. Thus, the user can be prompted to clear away a largish foreign substance adhering to the sheet reading unit 6 (the light-transmissive plate 6b).

The image forming apparatus includes the clock signal generating circuit 90 capable of generating a read clock signal CLK. A read clock signal CLK is input to the sheet reading unit 6. Based on input read clock signals CLK, the sheet reading unit 6 outputs analog picture signals A1 on a pixel-by-pixel basis and in order of sequence of pixels. A read clock signal CLK is also input to each first counting circuit 91. On the rising or falling edges of the input read clock signals CLK, the first counting circuit 91 confirms the level of the detection signals B1 and measures the duration time. Thus, the period of time during which reading of a foreign substance (a reflecting object) continues can be measured pixel by pixel without inconsistency with the clocks. In other words, it can be correctly detected that a signal level indicating that a reflecting object has been read has continued for the number of consecutive pixels corresponding to the first specified time.

The clock signal generating circuit 90 may be a spread spectrum clock generating circuit. In this case, electromagnetic noise generated from the sheet reading unit 6 can be reduced. Since a clock signal generated by the spread spectrum clock generating circuit (SSCG circuit) is input to both the sheet reading unit 6 and the first counting circuit 91, the period of time during which reading of a foreign substance (a reflecting object) continues can be measured pixel by pixel without inconsistency with the clocks.

Each signal processing circuit 80 includes the binarizing circuit 80a into which an analog picture signal A1 of each pixel is input. The signal processing circuit 80 generates as a detection signal B1 a binarized signal obtained by binarizing the analog picture signal A1 and outputs it. The signal processing circuit 80 can generate a binarized signal as a signal indicating whether or not a reflecting object (a foreign substance) has been read. Thus, the period of time during which a signal level indicating that a reflecting object has been read is maintained can be correctly and easily measured.

The image forming apparatus includes the second counting circuits 92. The second counting circuit 92 measures the duration time and outputs a second detection result signal S2. When the duration time reaches or exceeds the predetermined second specified time, the second counting circuit 92 changes the level of the second detection result signal S2 from a level indicating the absence of a sheet being conveyed on the sheet reading unit 6 to a level indicating the presence of a sheet being conveyed on the sheet reading unit 6. When the duration time is shorter than the second specified time, the second counting circuit 92 sets the level of the second detection result signal S2 at the level indicating the absence of a sheet being conveyed. Based on the level of the second detection result signal S2, the unit control circuit 8 recognizes whether or not the leading end of a sheet being conveyed has reached the sheet reading unit 6. The second specified time is longer than the first specified time. Even if some pixels have inconsecutively captured a reflecting object (a foreign substance), because they have not consecutively captured the foreign substance for the specified time, the level of the second detection result signal S2 is maintained at the level indicating the absence of a sheet being conveyed. Thus, an image forming apparatus can be provided that can avoid, even if a foreign substance, such as paper powder, is present on the sheet reading unit 6, a false detection of reaching of the leading end of a sheet being conveyed to the sheet reading unit 6. In addition, it is not necessary to closely monitor changes in the level of the second detection result signal S2 in order to determine whether or not the leading end of a sheet being conveyed has reached the sheet reading unit 6. For example, the unit control circuit 8 is sufficient to confirm, with each reading of one line, whether or not a change in the level of the second detection result signal S2 has occurred. Thus, it can be avoided to employ a high-speed, high-price unit control circuit as the unit control circuit 8. When the duration time exceeds the second specified time, the level of the second detection result signal S2 can be changed to the level indicating the presence of a sheet being conveyed. Thus, even if a somewhat large foreign substance is present on the sheet reading unit 6, a false detection of the presence of a sheet being conveyed can be prevented.

A first detection result signal S1 is input to the input terminal of the second counting circuit 92. Using the first detection result signal S1, the second counting circuit 92 recognizes that the duration time has reached or exceeded the second specified time. Thus, using a signal output by the first counting circuit 91, it can be determined whether or not the duration time has reached or exceeded the second specified time.

The image forming apparatus includes the AND circuits 93. The level of a first detection result signal S1 indicating the necessity of cleaning is the High level. The level of a second detection result signal S2 indicating the presence of a sheet being conveyed on the sheet reading unit 6 is also the High level. A first detection result signal S1 and a second detection result signal S2 are input to each AND circuit 93. The output of the AND circuit 93 is input to the unit control circuit 8. When the output of the AND circuit 93 reaches a High level, the unit control circuit 8 recognizes that the leading end of a sheet being conveyed has reached the sheet reading unit 6. Thus, using the AND circuits 93, it can be correctly recognized that the duration time has reached or exceeded the second specified time.

The image forming apparatus includes the register-less unit 7. The register-less unit 7 is provided upstream of the image forming device 5c and downstream of the sheet reading unit 6 in the direction of sheet conveyance. The register-less unit 7 includes: pairs of register-less rollers 7c capable of feeding a sheet being conveyed toward the image forming device 5c without stopping the sheet; a register-less motor 7d capable of rotating the pairs of register-less rollers 7c; a case 7a housing the pairs of register-less rollers 7c and including a fulcrum shaft 7g provided at one end of the case 7a in the main scanning direction; and a skew correction mechanism 71 capable of moving the other end of the case 7a around the fulcrum shaft 7g in the direction of sheet conveyance. The unit control circuit 8 recognizes the angle of tilt of a sheet being conveyed, using read-on-conveyance image data on the sheet generated based on analog picture signals A1. For the purpose of skew correction, the unit control circuit 8 allows the skew correction mechanism 71 to move the register-less unit 7. Thus, based on the read-on-conveyance image data on a sheet being conveyed acquired by image reading by the sheet reading unit 6, skew of the sheet being conveyed can be corrected. A foreign substance interfering with an accurate skew correction can be detected.

In a general image forming apparatus, a sheet is conveyed within the image forming apparatus and an image is formed on the sheet being conveyed. If the sheet being conveyed has caused deviation in posture or position, an image cannot suitably be formed on the sheet. To cope with this, the image forming apparatus may be internally provided with an image sensor capable of reading a sheet being conveyed (a sheet for use in printing). The state of conveyance of the sheet can be confirmed from image data acquired by image reading by the image sensor.

The image sensor itself is housed in the housing of a reading unit. By housing the image sensor, it can be prevented that dust directly adheres to the image sensor. One side of the housing is formed of a light-transmissive plate. The light-transmissive plate is, for example, a glass plate. The image sensor receives and reads light passing through the light-transmissive plate and then reflected on a target to be read (a sheet being conveyed).

A foreign substance (a reflecting object) may adhere to the light-transmissive plate. The foreign substance is, for example, paper powder, toner particles or dust. The foreign substance may cause a false detection of conveyance of a sheet. There is a difference in the level of analog picture signal output by the image sensor between a pixel (a light-receiving element) having captured a foreign substance and a pixel having captured a portion of the light-transmissive plate free of foreign substance. Therefore, the pixel having captured a foreign substance can be detected based on the level of analog picture signals in a state where no sheet is present on the light-transmissive plate. For example, an analog picture signal of the image sensor is input to a control circuit, such as a CPU. The control circuit monitors changes of analog picture signals and, based on them, determines the presence or absence of a foreign substance. For example, when determining the presence of a foreign substance, the control circuit allows a message prompting cleaning to be displayed.

Recently, the resolution of image sensors is improving. Therefore, a minute foreign substance can be detected. However, because the image sensor responds excessively sensitively to a foreign substance (it has an excessively high sensitivity of detection of a foreign substance), there may occur a problem that the image sensor requires a complicated control. For example, there may be a case where the image sensor frequently detects minute foreign substances, so that signals showing a frequent occurrence of large level changes may be input to the control circuit. If the number of times of level changes of input signals is excessively large, the control circuit may bear a large monitoring load. Therefore, in order that no delay in processing is caused by monitoring signals, it is necessary to use a control circuit capable of high-speed processing and expensive.

Furthermore, in the case where the image sensor detects the presence of a minute foreign substance corresponding to about one pixel, it is difficult to determine whether or not to request the user to do cleaning work. In some cases, a foreign substance, if minute, does not affect printing. If cleaning work is requested based only on the detection of a minute foreign substance, the frequency of requests for cleaning work may be excessively high. This may impose an undue work burden on the user.

In the facsimile apparatus described in BACKGROUND, its determiner compares white reference data with a reading result of an original document on a pixel-by-pixel basis and, therefore, the level of the ARM signal output by the determiner may change fast. Therefore, a request for cleaning work may be frequently issued, which makes the facsimile apparatus user-unfriendly.

In contrast, in the above-described multifunction peripheral 100 according to the embodiment, it is possible to avoid an excessive increase in the frequency of requests for cleaning work while reducing processing load on the control circuit determining the presence or absence of a foreign substance (a reflecting object).

Although an embodiment subject to the disclosure in the present application has thus far been described, the scope of what is to be disclosed in the application is not limited to the above embodiment and various embodiments can be implemented by adding various changes and modifications to the above embodiment without departing from the gist of the present disclosure.

For example, in the above embodiment, an example has been described in which when recognizing, using a first detection result signal S1, that the duration time has reached or exceeded the second specified time, the second counting circuit 92 changes the level of a second detection result signal S2. However, a detection signal B1 may be input to the second counting circuit 92. In this case, the second counting circuit 92 measures, based on input detection signals B1, the duration time which is a time during which the detection signals B1 maintain a level indicating that a reflecting object on the sheet reading unit 6 has been read. When the duration time reaches or exceeds the predetermined second specified time, the second counting circuit 92 changes the level of the second detection result signal S2 from a level indicating the absence of a sheet being conveyed to a level indicating the presence of a sheet being conveyed. When the duration time is shorter than the second specified time, the second counting circuit 92 maintains the level of the second detection result signal S2 at the level indicating the absence of a sheet being conveyed.

INDUSTRIAL APPLICABILITY

The contents described in the above disclosure can be applied to an image forming apparatus including a sheet reading unit capable of reading a sheet being conveyed.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a sheet conveying device capable of conveying a sheet;
   an image forming device that forms an image on the sheet being conveyed;
   a sheet reading unit including a lamp and a line sensor capable of reading the sheet being conveyed, the sheet reading unit being provided upstream of the image forming device in a direction of sheet conveyance;
   a signal processing circuit that generates, based on respective analog picture signals of pixels output by the line sensor and in order of sequence of the pixels, detection signals each indicating whether or not a reflecting object on the sheet reading unit has been read;
   a unit control circuit; and
   a first counting circuit capable of outputting a first detection result signal,
   wherein the first counting circuit measures a duration time which is a time during which the detection signals maintain a level indicating that the reflecting object on the sheet reading unit has been read,
   when the duration time reaches or exceeds a predetermined first specified time, the first counting circuit changes a level of the first detection result signal from a level indicating unnecessity of cleaning to a level indicating necessity of cleaning,
   when the duration time is shorter than the first specified time, the first counting circuit sets the level of the first detection result signal at the level indicating unnecessity of cleaning, and
   the unit control circuit determines, based on the level of the first detection result signal, whether or not it is necessary to clean the sheet reading unit.

2. The image forming apparatus according to claim 1, wherein
   the sheet reading unit includes a cleaning cover capable of being opened in cleaning,
   the image forming apparatus further comprises an open/close detection sensor capable of detecting an open state and a closed state of the cleaning cover, and
   when the open/close detection sensor detects the closed state of the cleaning cover after detecting the open state of the cleaning cover, the unit control circuit determines, based on the level of the first detection result signal, whether or not it is necessary to clean the sheet reading unit.

3. The image forming apparatus according to claim 1, further comprising a display panel that displays a message requesting to clean the sheet reading unit when the level of the first detection result signal switches to the level indicating necessity of cleaning.

4. The image forming apparatus according to claim 1,
   further comprising a clock signal generating circuit capable of generating a read clock signal,
   wherein the read clock signal is input to the sheet reading unit,
   the sheet reading unit outputs, based on the input read clock signals, the analog picture signals on a pixel-by-pixel basis and in order of sequence of the pixels,
   the read clock signal is input to the first counting circuit, and
   on rising or falling edges of the input read clock signals, the first counting circuit confirms the level of the detection signals and measures the duration time.

5. The image forming apparatus according to claim 4, wherein the clock signal generating circuit is a spread spectrum clock generating circuit.

6. The image forming apparatus according to claim 1, wherein
   the signal processing circuit includes a binarizing circuit into which the analog picture signals of the pixels are input, and
   the signal processing circuit generates a binarized signal obtained by binarizing the analog picture signal and outputs the binarized signal as the detection signal.

7. The image forming apparatus according to claim 1,
   further comprising a second counting circuit capable of measuring the duration time and outputting a second detection result signal,
   wherein when the duration time reaches or exceeds a predetermined second specified time, the second counting circuit changes a level of the second detection result signal from a level indicating absence of a sheet being conveyed on the sheet reading unit to a level indicating presence of a sheet being conveyed on the sheet reading unit,
   when the duration time is shorter than the second specified time, the second counting circuit sets the level of the second detection result signal at the level indicating the absence of a sheet being conveyed on the sheet reading unit,
   the unit control circuit recognizes, based on the level of the second detection result signal, whether or not a leading end of the sheet being conveyed has reached the sheet reading unit, and
   the second specified time is longer than the first specified time.

8. The image forming apparatus according to claim 7, wherein
   the first detection result signal is input to an input terminal of the second counting circuit, and
   using the first detection result signal, the second counting circuit recognizes that the duration time has reached or exceeded the second specified time.

9. The image forming apparatus according to claim 7,
   further comprising an AND circuit,
   wherein the level of the first detection result signal indicating necessity of cleaning is a High level, the level of the second detection result signal indicating presence of a sheet being conveyed on the sheet reading unit is also a High level, the first detection result signal and the second detection result signal are input to the AND circuit, an output of the AND circuit is input to the unit control circuit, and when the output of the AND circuit changes to a High level, the unit control circuit recognizes that the leading end of the sheet being conveyed has reached the sheet reading unit.

10. The image forming apparatus according to claim 1, further comprising a register-less unit provided upstream of the image forming device and downstream of the sheet reading unit in the direction of sheet conveyance, wherein the register-less unit comprises:

a pair of register-less rollers capable of feeding the sheet toward the image forming device without stopping the sheet;

a register-less motor capable of rotating the pair of register-less rollers;

a case housing the pair of register-less rollers and including a fulcrum shaft provided at one end of the case housing in a main scanning direction; and a skew correction mechanism capable of moving the other end of the case housing around the fulcrum shaft in the direction of sheet conveyance, and wherein the unit control circuit recognizes an angle of tilt of the sheet being conveyed using read-on-conveyance image data generated based on the analog picture signals and allows the skew correction mechanism to move the register-less unit for skew correction.

* * * * *